United States Patent
Naono et al.

(10) Patent No.: US 12,468,145 B2
(45) Date of Patent: Nov. 11, 2025

(54) MICROMIRROR DEVICE AND OPTICAL SCANNING DEVICE

(71) Applicant: FUJIFILM Corporation, Tokyo (JP)

(72) Inventors: Takayuki Naono, Kanagawa (JP); Keisuke Aoshima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 411 days.

(21) Appl. No.: 18/171,812

(22) Filed: Feb. 21, 2023

(65) Prior Publication Data
US 2023/0194855 A1 Jun. 22, 2023

Related U.S. Application Data

(63) Continuation of application No. PCT/JP2021/028498, filed on Jul. 30, 2021.

(30) Foreign Application Priority Data

Sep. 4, 2020 (JP) ................. 2020-149130

(51) Int. Cl.
*G02B 26/08* (2006.01)
*G02B 26/10* (2006.01)

(52) U.S. Cl.
CPC ....... *G02B 26/0858* (2013.01); *G02B 26/101* (2013.01)

(58) Field of Classification Search
CPC .. G02B 26/004; G02B 26/005; G02B 26/007; G02B 26/0825; G02B 26/0866
USPC ......... 359/198.1–199.4, 200.6–200.8, 202.1, 359/221.2, 223.1–225.1, 226.2, 904, 359/290–295, 838, 846, 871, 872
See application file for complete search history.

(56) References Cited

U.S. PATENT DOCUMENTS 7,986,449 B2 * 7/2011 Davis ................. G02B 26/0841
359/224.1
9,632,309 B2 4/2017 Yasuda
(Continued)

FOREIGN PATENT DOCUMENTS

DE 102009026507 A1 * 12/2010 ........... B81B 3/0021
JP 7-27989 A 1/1995
(Continued)

OTHER PUBLICATIONS

International Preliminary Report on Patentability for International Application No. PCT/JP2021/028498, dated Mar. 1, 2022, with an English translation.
(Continued)

*Primary Examiner* — Ricky L Mack
(74) *Attorney, Agent, or Firm* — Birch, Stewart, Kolasch & Birch, LLP

(57) ABSTRACT

A micromirror device includes: a mirror portion; a first support portion that swingably supports the mirror portion around a first axis; a movable frame that is connected to the first support portion; a second support portion that swingably supports the mirror portion, the first support portion, and the movable frame around a second axis; a pair of first actuators that are connected to the second support portion and face each other across the second axis; a second actuator that surrounds the first actuator; a first connecting portion that connects the first actuator and the second actuator; a fixed frame that surrounds the second actuator; and a second connecting portion that connects the second actuator and the fixed frame. The second actuator applies rotational torque around the first axis to the mirror portion. The first actuator applies rotational torque around the second axis to the movable frame.

9 Claims, 24 Drawing Sheets

(56) References Cited

U.S. PATENT DOCUMENTS

| | | | |
|---|---|---|---|
| 2003/0227700 A1* | 12/2003 | Mizuno | B81C 1/00182 |
| | | | 310/309 |
| 2010/0018635 A1* | 1/2010 | Kouma | G02B 26/0841 |
| | | | 156/155 |
| 2012/0133242 A1 | 5/2012 | Njikam Njimonzie et al. | |
| 2014/0355089 A1 | 12/2014 | Murayama et al. | |
| 2017/0343795 A1 | 11/2017 | Grutzeck et al. | |
| 2018/0180873 A1 | 6/2018 | Carminati et al. | |
| 2020/0271920 A1 | 8/2020 | Hirata et al. | |
| 2022/0382043 A1* | 12/2022 | Yoshizawa | H04N 9/3129 |

FOREIGN PATENT DOCUMENTS

| | | | | |
|---|---|---|---|---|
| JP | 2003-117897 A | 4/2003 | | |
| JP | 2010-60688 A | 3/2010 | | |
| JP | 2012-528343 A | 11/2012 | | |
| JP | 2013-160887 A | 8/2013 | | |
| KR | 100718143 B1 * | 5/2007 | | G02B 26/0841 |
| KR | 101345288 B1 * | 12/2013 | | G02B 26/101 |
| WO | WO-2009140017 A2 * | 11/2009 | | G02B 26/0841 |
| WO | WO-2011029821 A1 * | 3/2011 | | H04W 72/1263 |
| WO | WO-2020085063 A1 * | 4/2020 | | G02B 26/0858 |

OTHER PUBLICATIONS

International Search Report for International Application No. PCT/JP2021/028498, dated Sep. 7, 2021, with English translation.
Written Opinion of the International Searching Authority for International Application No. PCT/JP2021/028498. dated Sep. 7, 2021, with English translation.
Extended European Search Report for corresponding European Application No. 21864012.6, dated Feb. 14, 2024.

* cited by examiner

FIG. 16

| EXAMPLE 1 | DIMENSION (mm) | | | | | | RESONANCE FREQUENCY (kHz) | | | MATCHING RATE (%) | FIRST DRIVING FREQUENCY (kHz) | MAXIMUM DEFLECTION ANGLE (deg) |
|---|---|---|---|---|---|---|---|---|---|---|---|---|
| MODEL | T1 | T2 | Wx | Wy | L | | fm | fa | Δf | Δf/fm | $f_{d1}$ | θm |
| 1 | 0.13 | 0.13 | 1.286 | 1.285 | 7.20 | | 35.2 | 38.0 | -2.80 | -8.0 | 35.9 | 25 |
| 2 | 0.13 | 0.13 | 1.336 | 1.335 | 7.30 | | 35.2 | 37.0 | -1.80 | -5.1 | 35.9 | 28 |
| 3 | 0.13 | 0.13 | 1.386 | 1.385 | 7.40 | | 35.2 | 36.0 | -0.79 | -2.2 | 35.9 | 56 |
| 4 | 0.13 | 0.13 | 1.436 | 1.435 | 7.50 | | 35.2 | 35.0 | 0.17 | 0.5 | 35.8 | 97 |
| 5 | 0.13 | 0.13 | 1.486 | 1.485 | 7.60 | | 35.2 | 34.2 | 0.99 | 2.8 | 35.9 | 36 |
| 6 | 0.13 | 0.13 | 1.536 | 1.535 | 7.70 | | 35.2 | 33.3 | 1.89 | 5.4 | 35.9 | 33 |
| 7 | 0.13 | 0.13 | 1.636 | 1.635 | 7.90 | | 35.2 | 31.6 | 3.60 | 10.2 | 35.9 | 33 |
| 8 | 0.13 | 0.09 | 0.186 | 0.185 | 5.00 | | 35.2 | 38.6 | -3.40 | -9.7 | 35.3 | 12 |
| 9 | 0.13 | 0.09 | 0.236 | 0.235 | 5.10 | | 35.2 | 37.6 | -2.40 | -6.8 | 35.2 | 17 |
| 10 | 0.13 | 0.09 | 0.286 | 0.285 | 5.20 | | 35.2 | 36.5 | -1.30 | -3.7 | 35.2 | 23 |
| 11 | 0.13 | 0.09 | 0.326 | 0.325 | 5.28 | | 35.2 | 35.6 | -0.33 | -0.9 | 35.1 | 44 |
| 12 | 0.13 | 0.09 | 0.336 | 0.335 | 5.30 | | 35.2 | 35.3 | -0.11 | -0.3 | 35.1 | 64 |
| 13 | 0.13 | 0.09 | 0.386 | 0.385 | 5.40 | | 35.2 | 34.2 | 1.00 | 2.8 | 35.1 | 33 |
| 14 | 0.13 | 0.09 | 0.436 | 0.435 | 5.50 | | 35.2 | 33.1 | 2.20 | 6.3 | 35.1 | 26 |
| 15 | 0.13 | 0.09 | 0.486 | 0.485 | 5.60 | | 35.2 | 32.0 | 3.30 | 9.4 | 35.1 | 26 |

FIG. 22

| EXAMPLE 2 | DIMENSION (mm) | | | | | | RESONANCE FREQUENCY (kHz) | | | MATCHING RATE (%) | FIRST DRIVING FREQUENCY (kHz) | MAXIMUM DEFLECTION ANGLE (deg) |
|---|---|---|---|---|---|---|---|---|---|---|---|---|
| MODEL | T1 | T2 | Wx | Wy | L | fm | fa | Δf | Δf/fm | $f_{d1}$ | θm |
| 16 | 0.13 | 0.13 | 0.285 | 0.286 | 5.20 | 38.1 | 44.6 | -6.50 | -17.2 | 37.1 | 22 |
| 17 | 0.13 | 0.13 | 0.435 | 0.436 | 5.50 | 38.1 | 44.2 | -4.10 | -10.2 | 37.1 | 30 |
| 18 | 0.13 | 0.13 | 0.585 | 0.586 | 5.80 | 38.1 | 39.0 | -0.90 | -2.4 | 36.8 | 46 |
| 19 | 0.13 | 0.13 | 0.635 | 0.636 | 5.90 | 38.1 | 37.9 | 0.20 | 0.5 | 36.6 | 54 |
| 20 | 0.13 | 0.13 | 0.735 | 0.736 | 6.10 | 38.1 | 35.8 | 2.30 | 6.1 | 39.0 | 38 |
| 21 | 0.13 | 0.13 | 0.885 | 0.886 | 6.40 | 38.1 | 32.1 | 6.00 | 15.6 | 38.1 | 21 |
| 22 | 0.13 | 0.13 | 1.035 | 1.036 | 6.70 | 38.1 | 29.9 | 8.20 | 21.5 | 37.9 | 17 |
| 23 | 0.13 | 0.13 | 1.185 | 1.186 | 7.00 | 38.1 | 27.3 | 10.70 | 28.2 | 37.8 | 21 |

FIG. 27

| EXAMPLE 3 | DIMENSION (mm) | | | | | | | RESONANCE FREQUENCY (kHz) | | | MATCHING RATE (%) | FIRST DRIVING FREQUENCY (kHz) | MAXIMUM DEFLECTION ANGLE (deg) |
|---|---|---|---|---|---|---|---|---|---|---|---|---|---|
| MODEL | T1 | T2 | Wx | Wy | Wz | L | fm | fa | Δf | Δf/fm | $f_{d1}$ | θm |
| 24 | 0.13 | 0.09 | 0.285 | 0.285 | 0.850 | 5.20 | 37.0 | 41.6 | -4.60 | -12.3 | 36.2 | 32 |
| 25 | 0.13 | 0.09 | 0.285 | 0.285 | 0.600 | 5.20 | 37.0 | 36.4 | 0.60 | 0.6 | 35.8 | 40 |
| 26 | 0.13 | 0.09 | 0.285 | 0.285 | 0.450 | 5.20 | 37.0 | 34.1 | 2.90 | 2.9 | 35.5 | 44 |
| 27 | 0.13 | 0.09 | 0.285 | 0.285 | 0.320 | 5.20 | 37.0 | 32.9 | 4.10 | 4.1 | 34.4 | 48 |
| 28 | 0.13 | 0.09 | 0.285 | 0.285 | 0 | 5.20 | 37.0 | 30.9 | 6.10 | 6.1 | 38.1 | 34 |
| 29 | 0.13 | 0.09 | 0.435 | 0.435 | 0 | 5.50 | 37.0 | 29.6 | 7.40 | 7.4 | 38.1 | 29 |
| 30 | 0.13 | 0.09 | 0.735 | 0.735 | 0 | 5.80 | 37.0 | 27.5 | 9.50 | 9.5 | 37.6 | 27 |

MICROMIRROR DEVICE AND OPTICAL SCANNING DEVICE

CROSS-REFERENCE TO RELATED APPLICATION

This application is a continuation application of International Application No. PCT/JP2021/028498, filed Jul. 30, 2021, the disclosure of which is incorporated herein by reference in its entirety. Further, this application claims priority from Japanese Patent Application No. 2020-149130 filed on Sep. 4, 2020, the disclosure of which is incorporated herein by reference in its entirety.

BACKGROUND

1. Technical Field

The technique of the present disclosure relates to a micromirror device and an optical scanning device.

2. Description of the Related Art

A micromirror device (also referred to as a microscanner) is known as one of micro electro mechanical systems (MEMS) devices manufactured using the silicon (Si) nanofabrication technique. Since the micromirror device is small and has low power consumption, it is expected to have a wide range of applications in laser displays, laser projectors, optical coherence tomography, and the like.

There are various methods of driving the micromirror device. For example, JP2003-117897A discloses a micromirror device of an electrostatic drive method. JP1995-027989A (JP-H07-027989A) discloses a micromirror device of an electromagnetic drive method. Furthermore, JP2010-060688A discloses a micromirror device of a piezoelectric drive method.

The piezoelectric drive method is promising since generated torque is higher than that in other drive methods and a high scan angle can be obtained. In particular, in a case where a high scan angle is required, such as in a laser display, a higher scan angle can be obtained by driving the micromirror device of the piezoelectric drive method by resonance drive.

A general micromirror device used in a laser display comprises a mirror portion and piezoelectric first and second actuators (see, for example, JP2010-060688A). The mirror portion is swingable around a first axis and a second axis that are orthogonal to each other. The first actuator allows the mirror portion to swing around the first axis according to a driving voltage supplied from the outside. The second actuator allows the mirror portion to swing around the second axis according to a driving voltage supplied from the outside. The scan angle described above corresponds to a maximum value of a deflection angle (hereinafter, referred to as a maximum deflection angle) of the mirror portion.

In addition, it is known that two-dimensional optical scanning is performed by allowing the mirror portion to resonate around the first axis and the second axis (see, for example, JP2010-060688A). Such two-dimensional optical scanning is called Lissajous scanning.

The micromirror device disclosed in JP2010-060688A includes a mirror portion, a first actuator connected by the mirror portion and a first support portion, a frame connected by the first actuator and a second support portion, and a second actuator connected by the frame and a third support portion.

SUMMARY

In the micromirror device disclosed in JP2010-060688A, the first actuator allows the mirror portion to swing with the first support portion as the first axis, and the second actuator allows the mirror portion to swing with the second support portion as the second axis. Therefore, the first actuator allows only the mirror portion to swing, whereas the second actuator allows the mirror portion, the first actuator, and the frame to swing.

In the micromirror device disclosed in JP2010-060688A, the maximum deflection angle around the first axis by the first actuator and the weight of a swing portion by the second actuator (that is, the mirror portion, the first actuator, and the frame) cannot be determined independently. For example, in a case where an attempt is made to increase the maximum deflection angle around the first axis, it is necessary to increase a size of the first actuator in order to increase torque around the first axis by the first actuator. In a case where the size of the first actuator is increased, the weight of the first actuator is increased, so that a resonance frequency around the second axis is decreased.

An object of the technique of the present disclosure is to provide a micromirror device and an optical scanning device capable of increasing a maximum deflection angle around a first axis without decreasing a resonance frequency around a second axis.

In order to achieve the above-mentioned object, according to the present disclosure, there is provided a micromirror device comprising: a mirror portion having a reflecting surface for reflecting incident light; a first support portion that is connected to the mirror portion on a first axis located in a plane including the reflecting surface of the mirror portion in a stationary state, and that swingably supports the mirror portion around the first axis; a pair of movable frames that are connected to the first support portion and face each other across the first axis; a second support portion that is connected to the movable frame on a second axis which is located in the plane including the reflecting surface of the mirror portion in the stationary state and is orthogonal to the first axis, and that swingably supports the mirror portion, the first support portion, and the movable frame around the second axis; a pair of first actuators that are connected to the second support portion and face each other across the second axis, and that have a piezoelectric element; a pair of second actuators that surround the first actuator and face each other across the first axis, and that have a piezoelectric element; a first connecting portion that connects the first actuator and the second actuator; a fixed frame that surrounds the second actuator; and a second connecting portion that connects the second actuator and the fixed frame, in which the second actuator applies rotational torque around the first axis to the mirror portion and the first actuator applies rotational torque around the second axis to the movable frame, thereby allowing the mirror portion to swing around the first axis and the second axis.

It is preferable that the first connecting portion connects the first actuator and the second actuator in the vicinity of either one or both of the first axis and the second axis, the second connecting portion connects the fixed frame and the second actuator in the vicinity of either one or both of the first axis and the second axis, and includes a second A connecting portion that connects the fixed frame and the second actuator on the same axis as the first connecting portion, a virtual extension portion is configured in which the first connecting portion is virtually extended along the first axis to an end part of the second actuator on a side opposite to the mirror portion, a first structural portion is formed of the mirror portion, the first support portion, the movable frame, the second support portion, the first actuator, the first connecting portion, the virtual extension portion, and the second A connecting portion, and a second structural portion is formed of the second actuator and the second connecting portion, and in a case where a resonance frequency of a first resonance mode, in which the mirror portion swings around the first axis, among resonance modes of the first structural portion in a case where an end part of the second connecting portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of |fm−fa|/fm≤0.03 is satisfied.

It is preferable that the first connecting portion connects the first actuator and the second actuator in the vicinity of either the first axis or the second axis, the second connecting portion connects the fixed frame and the second actuator in the vicinity of one of the first axis and the second axis, the one axis being orthogonal to the other on which the first connecting portion is disposed, a virtual extension portion is configured in which the first connecting portion is virtually extended along the first axis to an end part of the second actuator on a side opposite to the mirror portion, a first structural portion is formed of the mirror portion, the first support portion, the movable frame, the second support portion, the first actuator, the first connecting portion, and the virtual extension portion, and a second structural portion is formed of the second actuator and the second connecting portion, and in a case where a resonance frequency of a first resonance mode, in which the mirror portion swings around the first axis, among resonance modes of the first structural portion in a case where an end part of the virtual extension portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of 0≤(fm−fa)/fm≤0.14 is satisfied.

It is preferable that the first connecting portion connects the first actuator and the second actuator in the vicinity of either one or both of the first axis and the second axis, the second connecting portion connects the fixed frame and the second actuator in the vicinity of either one or both of the first axis and the second axis, and includes a second A connecting portion that connects the fixed frame and the second actuator on the same axis as the first connecting portion, a virtual extension portion is configured in which the first connecting portion is virtually extended along the first axis to an end part of the second actuator on a side opposite to the mirror portion, a first structural portion is formed of the mirror portion, the first support portion, the movable frame, the second support portion, the first actuator, the first connecting portion, the virtual extension portion, and the second A connecting portion, and a second structural portion is formed of the second actuator and the second connecting portion, and in a case where a resonance frequency of a first resonance mode, in which the mirror portion swings around the first axis, among resonance modes of the first structural portion in a case where an end part of the second connecting portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of |fm−fa|/fm>0.03 is satisfied.

It is preferable that the first connecting portion connects the first actuator and the second actuator in the vicinity of either the first axis or the second axis, the second connecting portion connects the fixed frame and the second actuator in the vicinity of one of the first axis and the second axis, the one axis being orthogonal to the other on which the first connecting portion is disposed, a virtual extension portion is configured in which the first connecting portion is virtually extended along the first axis to an end part of the second actuator on a side opposite to the mirror portion, a first structural portion is formed of the mirror portion, the first support portion, the movable frame, the second support portion, the first actuator, the first connecting portion, and the virtual extension portion, and a second structural portion is formed of the second actuator and the second connecting portion, and in a case where a resonance frequency of a first resonance mode, in which the mirror portion swings around the first axis, among resonance modes of the first structural portion in a case where an end part of the virtual extension portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of (fm−fa)/fm<0 or (fm−fa)/fm>0.14 is satisfied.

It is preferable that the first actuator has the same thickness as the mirror portion, and the second actuator has a thinner thickness than the first actuator.

It is preferable that the first connecting portion is disposed along the first support portion.

It is preferable that each of the pair of first actuators is semi-annular.

It is preferable that each of the pair of second actuators is semi-annular.

According to the present disclosure, there is provided an optical scanning device comprising: the micromirror device according to any one of the aspects described above; a processor that drives the first actuator and the second actuator, in which the processor allows the mirror portion to resonate around the first axis and the second axis by giving a driving signal to the first actuator and the second actuator.

According to the technique of the present disclosure, it is possible to provide a micromirror device and an optical scanning device capable of increasing a maximum deflection angle around a first axis without decreasing a resonance frequency around a second axis.

BRIEF DESCRIPTION OF THE DRAWINGS

Exemplary embodiments according to the technique of the present disclosure will be described in detail based on the following figures, wherein:

FIG. 16 is a diagram showing simulation results, FIG. 22 is a diagram showing simulation results, FIG. 27 is a diagram showing simulation results, FIG. 29A shows a first shape, FIG. 29B shows a second shape, and FIG. 29C shows a third shape.

DETAILED DESCRIPTION

An example of an embodiment relating to the technique of the present disclosure will be described with reference to the accompanying drawings.

First Embodiment

Figure 1:
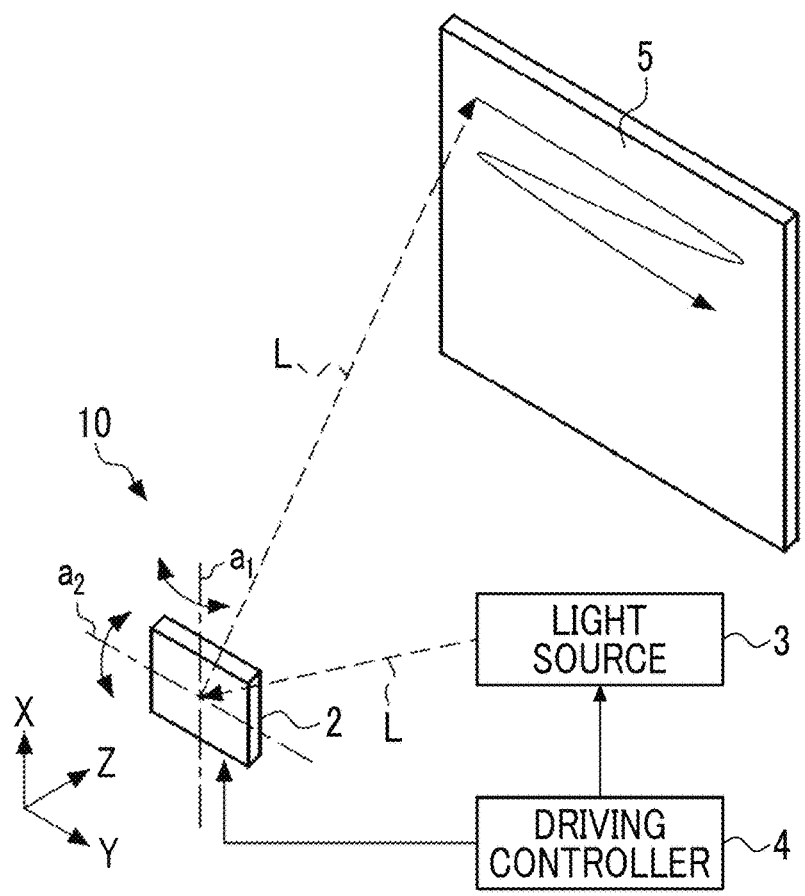
FIG. 1 is a schematic view of an optical scanning device.

FIG. 1 schematically shows an optical scanning device 10 according to an embodiment. The optical scanning device 10 includes a micromirror device (hereinafter, referred to as micromirror device (MMD)) 2, a light source 3, and a driving controller 4. The optical scanning device 10 opti- cally scans a surface to be scanned 5 by reflecting a light beam L emitted from the light source 3 by the MMD 2 under the control of the driving controller 4. The surface to be scanned 5 is, for example, a screen.

The MMD 2 is a piezoelectric biaxial drive type micromirror device capable of allowing a mirror portion 20 (see FIG. 3) to swing (that is, reciprocative rotate) around a first axis $a_1$ and a second axis $a_2$ orthogonal to the first axis $a_1$. Hereinafter, the direction parallel to the first axis $a_1$ is referred to as an X direction, the direction parallel to the second axis $a_2$ is a Y direction, and the direction orthogonal to the first axis $a_1$ and the second axis $a_2$ is referred to as a Z direction.

The light source 3 is a laser device that emits, for example, laser light as the light beam L. It is preferable that the light source 3 emits the light beam L perpendicularly to a reflecting surface 20A (see FIG. 3) included in the mirror portion 20 in a state where the mirror portion 20 of the MMD 2 is stationary. An angle at which the light beam L emitted from the light source 3 is applied to the reflecting surface 20A is not limited to the perpendicular direction, and the light beam L may be emitted obliquely to the reflecting surface 20A.

The driving controller 4 outputs a driving signal to the light source 3 and the MMD 2 based on optical scanning information. The light source 3 generates the light beam L based on the input driving signal and emits the light beam L to the MMD 2. The MMD 2 allows the mirror portion 20 to swing around the first axis $a_1$ and the second axis $a_2$ based on the input driving signal.

As will be described in detail below, the driving controller 4 allows the mirror portion 20 to resonate around the first axis $a_1$ and the second axis $a_2$, so that the surface to be scanned 5 is scanned with the light beam L reflected by the mirror portion 20 such that a Lissajous waveform is drawn. This optical scanning method is called a Lissajous scanning method.

The optical scanning device 10 is applied to, for example, a Lissajous scanning type laser display. Specifically, the optical scanning device 10 can be applied to a laser scanning display such as augmented reality (AR) glass or virtual reality (VR) glass.

Figure 2:
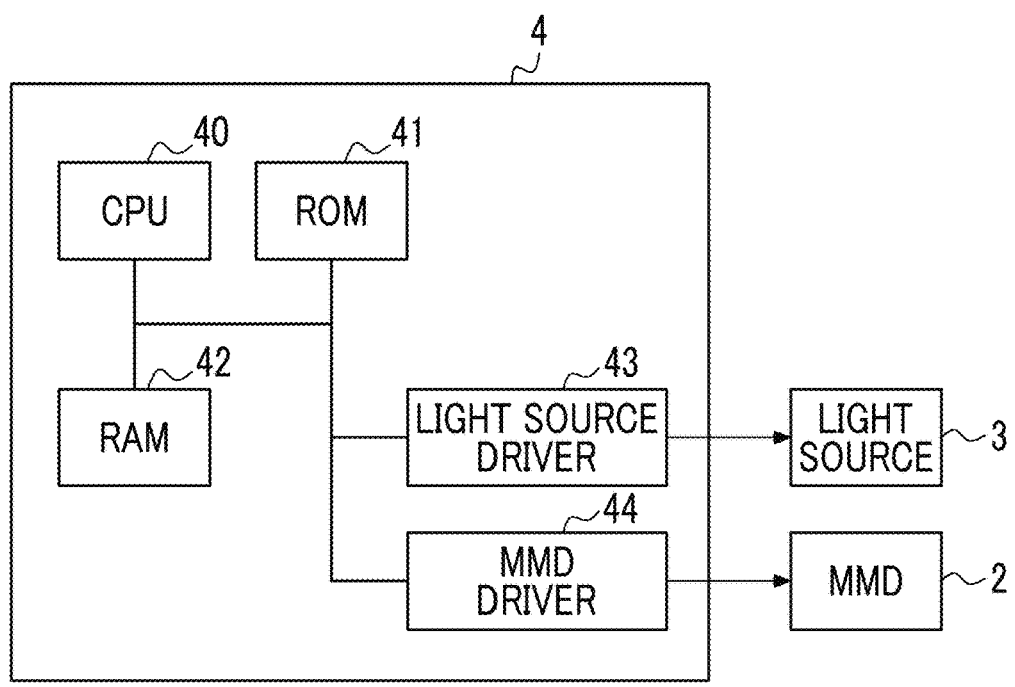
FIG. 2 is a block diagram showing an example of a hardware configuration of a driving controller.

FIG. 2 shows an example of a hardware configuration of the driving controller 4. The driving controller 4 has a central processing unit (CPU) 40, a read only memory (ROM) 41, a random access memory (RAM) 42, a light source driver 43, and an MMD driver 44. The CPU 40 is an arithmetic unit that realizes the entire function of the driving controller 4 by reading out a program and data from a storage device such as the ROM 41 into the RAM 42 and executing processing. The CPU 40 is an example of a "processor" according to the technique of the present disclosure.

The ROM 41 is a non-volatile storage device and stores a program for the CPU 40 to execute processing and data such as the optical scanning information described above. The RAM 42 is a non-volatile storage device that temporarily holds a program and data.

The light source driver 43 is an electric circuit that outputs a driving signal to the light source 3 under the control of the CPU 40. In the light source driver 43, the driving signal is a driving voltage for controlling the irradiation timing and the irradiation intensity of the light source 3.

The MMD driver 44 is an electric circuit that outputs a driving signal to the MMD 2 under the control of the CPU 40. In the MMD driver 44, the driving signal is a driving voltage for controlling the timing, cycle, and deflection angle for allowing the mirror portion 20 of the MMD 2 to swing.

The CPU 40 controls the light source driver 43 and the MMD driver 44 based on the optical scanning information. The optical scanning information is information including the scanning pattern of the light beam L with which the surface to be scanned 5 is scanned and the light emission timing of the light source 3.

Figure 3:
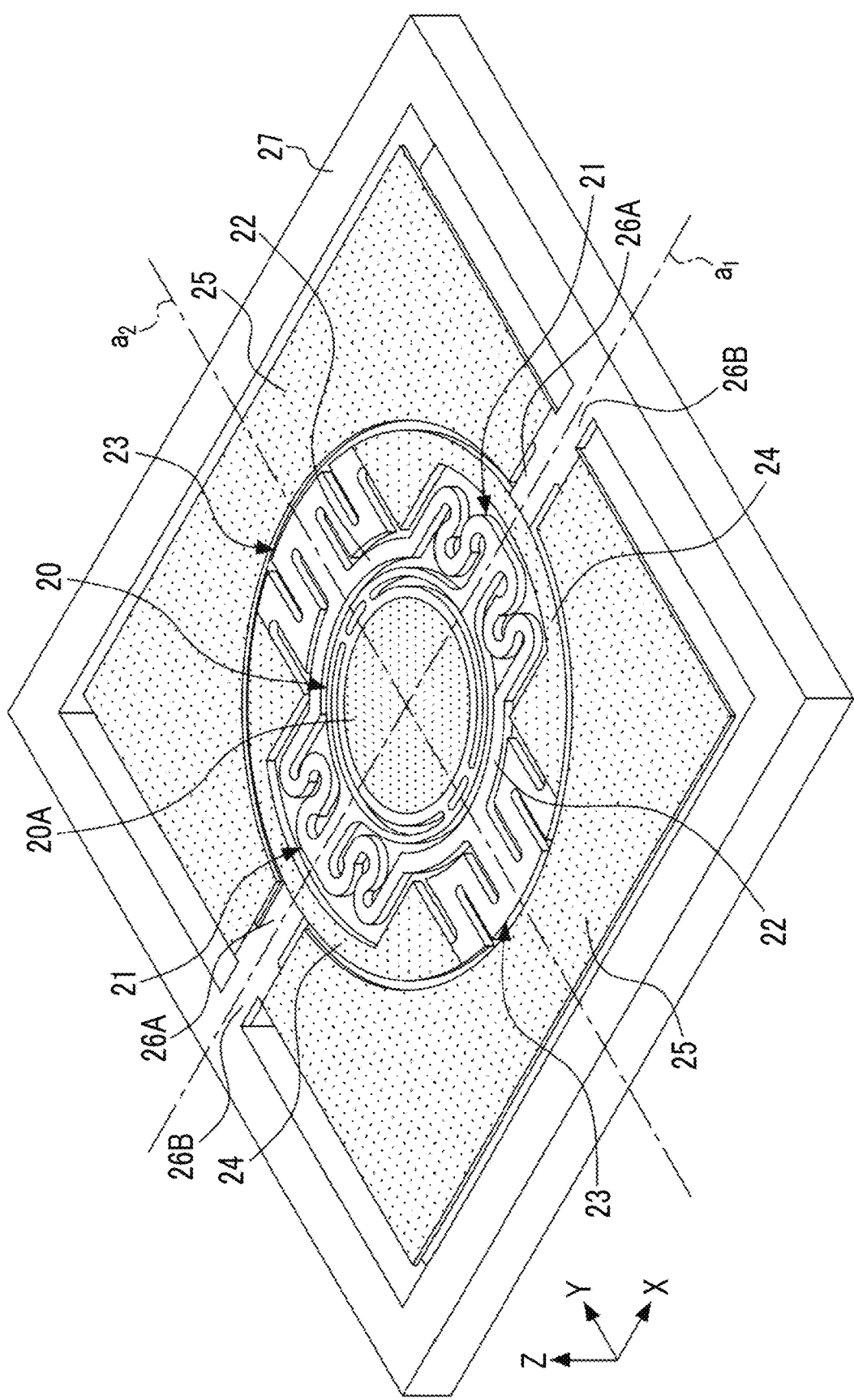
FIG. 3 is an external perspective view of a micromirror device.
Figure 4:
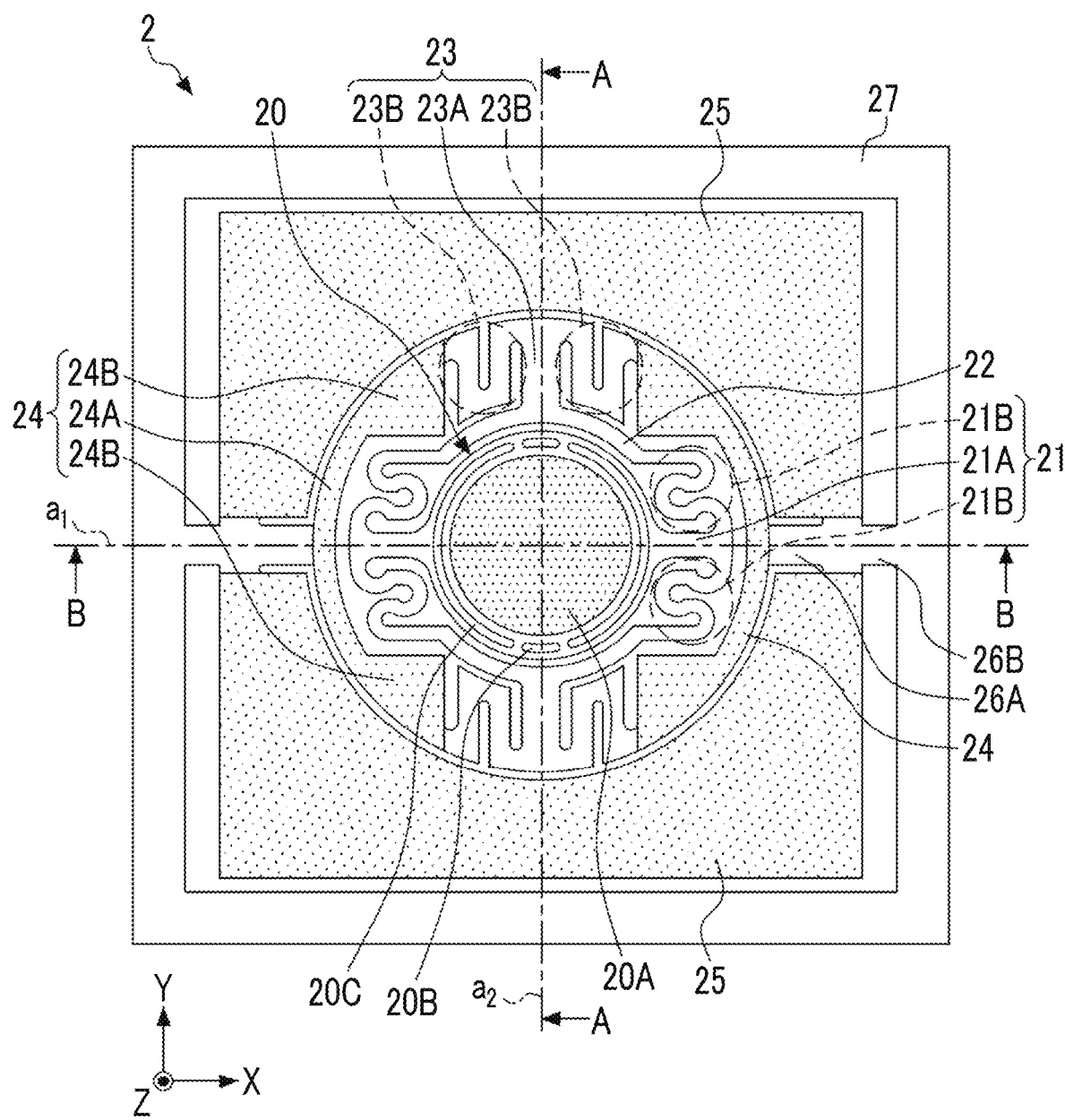
FIG. 4 is a plan view of the micromirror device as viewed from the light incident side.
Figure 5:
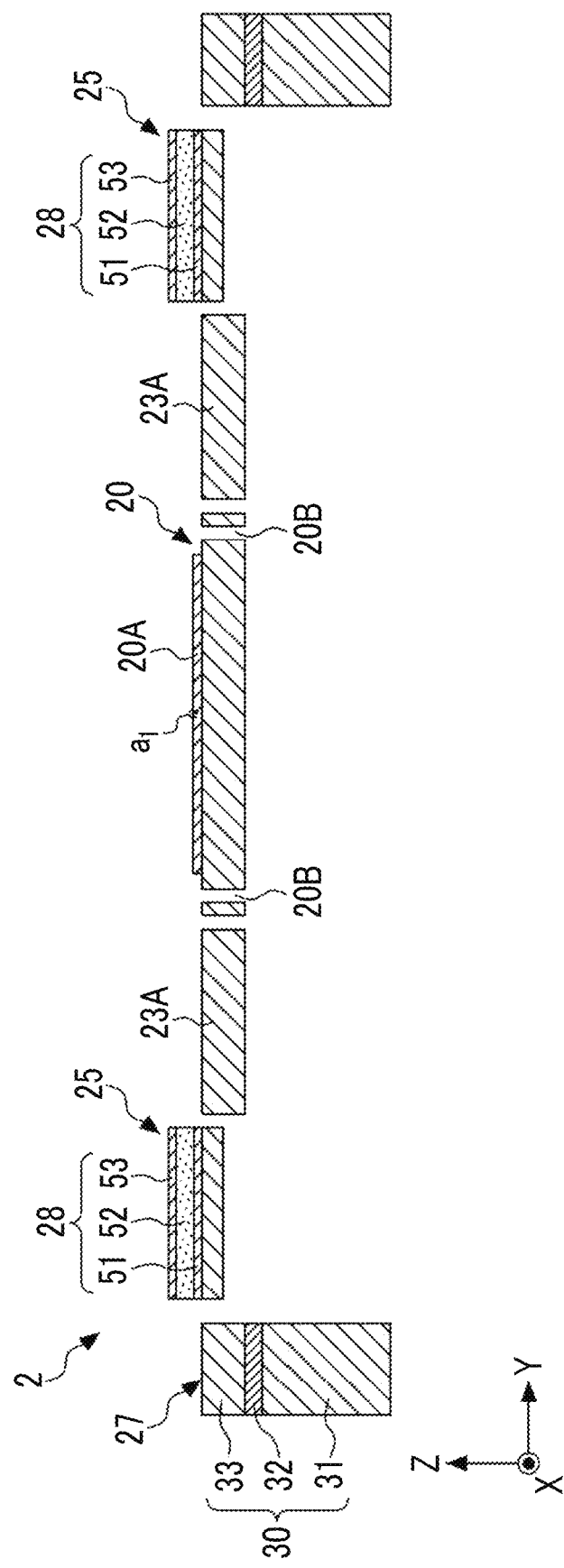
FIG. 5 is a cross-sectional view taken along the line A-A of FIG. 4.
Figure 6:
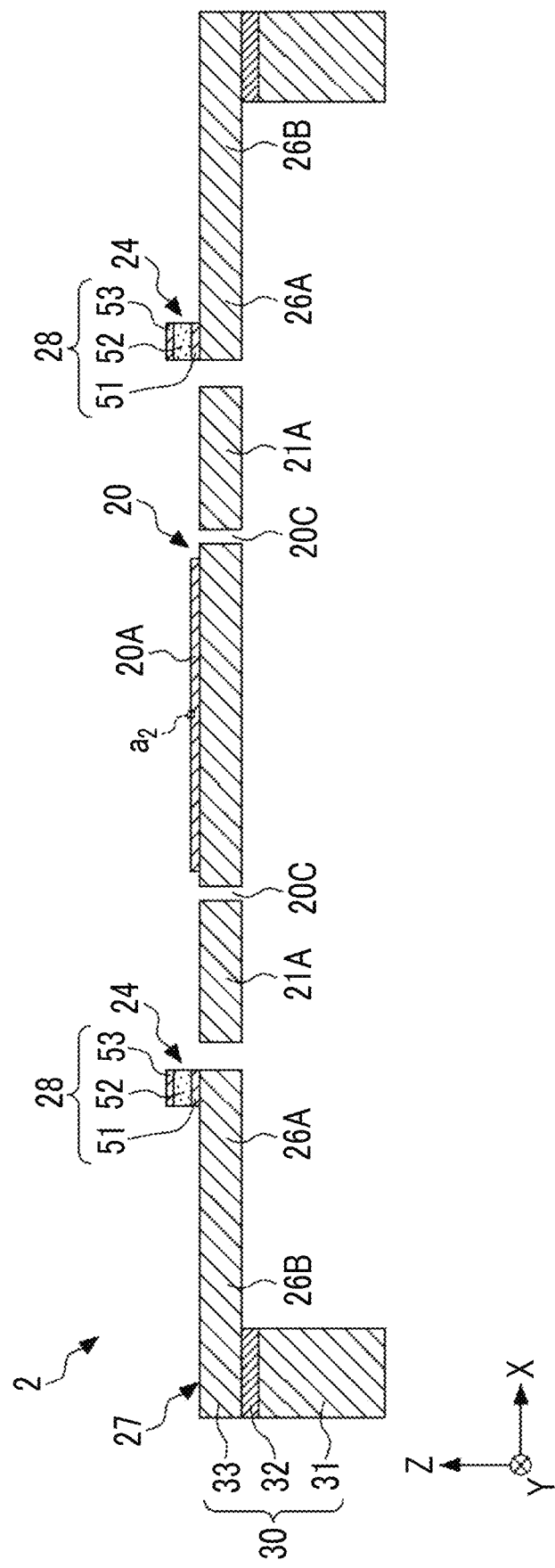
FIG. 6 is a cross-sectional view taken along the line B-B of FIG. 4.

Next, an example of the MMD 2 will be described with reference to FIGS. 3 to 6. FIG. 3 is an external perspective view of the MMD 2. FIG. 4 is a plan view of the MMD 2 as viewed from the light incident side. FIG. 5 is a cross-sectional view taken along the line A-A in FIG. 4. FIG. 6 is a cross-sectional view taken along the line B-B in FIG. 4.

As shown in FIG. 3, the MMD 2 has the mirror portion 20, a pair of first support portions 21, a pair of movable frames 22, a pair of second support portions 23, a pair of first actuators 24, a pair of second actuators 25, a pair of first connecting portions 26A, a pair of second connecting portions 26B, and a fixed frame 27. The MMD 2 is a so-called MEMS scanner.

The mirror portion 20 has a reflecting surface 20A for reflecting incident light. The reflecting surface 20A is formed of a metal thin film such as gold (Au) and aluminum (Al) provided on one surface of the mirror portion 20. The shape of the reflecting surface 20A is, for example, circular with the intersection of the first axis $a_1$ and the second axis $a_2$ as the center.

The first axis $a_1$ and the second axis $a_2$ exist in a plane including the reflecting surface 20A in a case where the mirror portion 20 is stationary. The planar shape of the MMD 2 is rectangular, line-symmetrical with respect to the first axis $a_1$, and line-symmetrical with respect to the second axis $a_2$.

The pair of first support portions 21 are disposed at positions facing each other across the second axis $a_2$, and have a shape that is line-symmetrical with respect to the second axis $a_2$. In addition, each of the first support portions 21 has a shape that is line-symmetrical with respect to the first axis $a_1$. The first support portions 21 are connected to the mirror portion 20 on the first axis $a_1$, and swingably support the mirror portion 20 around the first axis $a_1$.

The pair of movable frames 22 are disposed at positions facing each other across the first axis $a_1$, and have a shape that is line-symmetrical with respect to the first axis $a_1$. Each of the movable frames 22 has a shape that is line-symmetrical with respect to the second axis $a_2$. In addition, each of the movable frames 22 has a semi-annular shape curved in an arc shape along the outer periphery of the mirror portion 20. Both ends of the movable frame 22 are connected to the first support portion 21.

The first support portion 21 and the movable frame 22 are connected to each other to surround the mirror portion 20. The movable frame 22 and the first support portion 21 have an integral structure that is continuously formed. A shape formed by the pair of movable frames 22 includes an annular shape such as a circular ring.

The pair of second support portions 23 are disposed at positions facing each other across the first axis $a_1$, and have a shape that is line-symmetrical with respect to the first axis $a_1$. Each of the second support portions 23 has a shape that is line-symmetrical with respect to the second axis $a_2$. The second support portion 23 is connected to the movable frame 22 on the second axis $a_2$, and swingably supports the mirror portion 20, the first support portion 21, and the movable frame 22 around the second axis $a_2$. In addition, both ends of the second support portion 23 are connected to the first actuator 24.

The pair of first actuators 24 are disposed at positions facing each other across the second axis $a_2$, and have a shape that is line-symmetrical with respect to the second axis $a_2$. In addition, each of the first actuators 24 has a shape that is line-symmetrical with respect to the first axis $a_1$. Each of the first actuators 24 has a semi-annular shape curved along the outer periphery of the first support portion 21.

The pair of first actuators 24 are connected to each other via the pair of second support portions 23 to surround the mirror portion 20, the first support portion 21, and the movable frame 22. The first actuator 24 and the second support portion 23 have an integral structure that is continuously formed. A shape formed by the pair of first actuators 24 includes an annular shape such as a circular ring.

The pair of second actuators 25 are disposed at positions facing each other across the first axis $a_1$, and have a shape that is line-symmetrical with respect to the first axis $a_1$. In addition, each of the second actuators 25 has a shape that is line-symmetrical with respect to the second axis $a_2$. Each of the second actuators 25 has a semi-annular shape curved along the outer periphery of the first actuator 24 and the second support portion 23. In addition, the second actuators 25 are connected to the pair of first connecting portions 26A.

The pair of first connecting portions 26A are disposed at positions facing each other across the second axis $a_2$, and have a shape that is line-symmetrical with respect to the second axis $a_2$. In addition, each of the first connecting portions 26A has a shape that is line-symmetrical with respect to the first axis $a_1$. The first connecting portion 26A is disposed along the first axis $a_1$, and connects the first actuator 24 and the second actuator 25 on the first axis $a_1$.

The pair of second actuators 25 are connected to each other to surround the mirror portion 20, the first support portion 21, the movable frame 22, and the first actuator 24. A shape formed by the pair of second actuators 25 includes an annular shape such as a circular ring.

The fixed frame 27 is a frame-shaped member having a rectangular outer shape, and has a shape that is line-symmetrical with respect to each of the first axis $a_1$ and the second axis $a_2$. The fixed frame 27 surrounds the outer periphery of the second actuator 25. The fixed frame 27 is connected to the second actuator 25 via the second connecting portion 26B.

The pair of second connecting portions 26B are disposed at positions facing each other across the second axis $a_2$, and have a shape that is line-symmetrical with respect to the second axis $a_2$. In addition, each of the second connecting portions 26B has a shape that is line-symmetrical with respect to the first axis $a_1$. The second connecting portion 26B is disposed along the first axis $a_1$, and connects the second actuator 25 and the fixed frame 27 on the first axis $a_1$.

The first actuator 24 and the second actuator 25 are piezoelectric actuators each comprising a piezoelectric element. The pair of first actuators 24 allow the mirror portion 20 to swing around the second axis $a_2$ by applying rotational torque around the second axis $a_2$ to the movable frame 22. The pair of second actuators 25 allow the mirror portion 20 to swing around the first axis $a_1$ by applying rotational torque around the first axis $a_1$ to the mirror portion 20.

As shown in FIG. 4, the first support portion 21 is composed of a swing shaft 21A and a pair of coupling portions 21B. The swing shaft 21A is a so-called torsion bar stretched along the first axis $a_1$. One end of the swing shaft 21A is connected to the mirror portion 20, and the other end thereof is connected to the coupling portion 21B.

The pair of coupling portions 21B are disposed at positions facing each other across the first axis $a_1$, and have a shape that is line-symmetrical with respect to the first axis $a_1$. One end of the coupling portion 21B is connected to the swing shaft 21A, and the other end thereof is connected to the movable frame 22. The coupling portion 21B has a folded structure. Since the coupling portion 21B has elasticity due to the folded structure, the internal stress applied to the swing shaft 21A is relaxed in a case where the mirror portion 20 swings around the first axis $a_1$.

The second support portion 23 is composed of a swing shaft 23A and a pair of coupling portions 23B. The swing shaft 23A is a so-called torsion bar stretched along the second axis $a_2$. One end of the swing shaft 23A is connected to the movable frame 22, and the other end thereof is connected to the coupling portion 23B.

The pair of coupling portions 23B are disposed at positions facing each other across the second axis $a_2$, and have a shape that is line-symmetrical with respect to the second axis $a_2$. One end of the coupling portion 23B is connected to the swing shaft 23A, and the other end thereof is connected to the first actuator 24. The coupling portion 23B has a folded structure. Since the coupling portion 23B has elasticity due to the folded structure, the internal stress applied to the swing shaft 23A is relaxed in a case where the mirror portion 20 swings around the second axis $a_2$.

The first actuator 24 is composed of an arc-shaped portion 24A and a pair of fan-shaped portions 24B. The arc-shaped portion 24A has a shape that is line-symmetrical with respect to the first axis $a_1$. Both ends of the arc-shaped portion 24A are connected to the fan-shaped portion 24B.

The pair of fan-shaped portions 24B are disposed at positions facing each other across the first axis $a_1$, and have a shape that is line-symmetrical with respect to the first axis $a_1$. One end of the fan-shaped portion 24B is connected to the arc-shaped portion 24A, and the other end thereof is connected to the coupling portion 23B of the second support portion 23. Since the first actuator 24 has the fan-shaped portion 24B having a large area, an area of the piezoelectric element is large. As a result, a large driving torque is obtained around the second axis $a_2$ by the first actuator 24.

In the mirror portion 20, a plurality of slits 20B and 20C are formed on the outside of the reflecting surface 20A along the outer periphery of the reflecting surface 20A. The plurality of slits 20B and 20C are disposed at positions that are line-symmetrical with respect to the first axis $a_1$ and the second axis $a_2$, respectively. The slit 20B has an effect of suppressing distortion generated on the reflecting surface 20A due to the swing of the mirror portion 20.

In FIGS. 3 and 4, the wiring line and the electrode pad for giving the driving signal to the first actuator 24 and the second actuator 25 are not shown. A plurality of the electrode pads are provided on the fixed frame 27.

As shown in FIGS. 5 and 6, the MMD 2 is formed, for example, by performing an etching treatment on a silicon on insulator (SOI) substrate 30. The SOI substrate 30 is a substrate in which a silicon oxide layer 32 is provided on a first silicon active layer 31 made of single crystal silicon, and a second silicon active layer 33 made of single crystal silicon is provided on the silicon oxide layer 32.

The mirror portion 20, the first support portion 21, the movable frame 22, the second support portion 23, the first actuator 24, the second actuator 25, the first connecting portion 26A, and the second connecting portion 26B are formed of the second silicon active layer 33 remaining by removing the first silicon active layer 31 and the silicon oxide layer 32 from the SOI substrate 30 by an etching treatment. The second silicon active layer 33 functions as an elastic portion having elasticity. The fixed frame 27 is formed of three layers of the first silicon active layer 31, the silicon oxide layer 32, and the second silicon active layer 33.

The first actuator 24 has the same thickness as the mirror portion 20. The second actuator 25 is formed such that a thickness of the second silicon active layer 33 is thinner than that of the first actuator 24 by performing an etching treatment on the second silicon active layer 33. That is, the thickness of the second actuator 25 is thinner than that of the first actuator 24 in the Z direction.

The first actuator 24 and the second actuator 25 have the piezoelectric element 28 on the second silicon active layer 33. The piezoelectric element 28 has a laminated structure in which a lower electrode 51, a piezoelectric film 52, and an upper electrode 53 are sequentially laminated on the second silicon active layer 33. An insulating film is provided on the upper electrode 53, but is not shown.

The upper electrode 53 and the lower electrode 51 are formed of, for example, gold (Au) or platinum (Pt). The piezoelectric film 52 is formed of, for example, lead zirconate titanate (PZT), which is a piezoelectric material. The upper electrode 53 and the lower electrode 51 are electrically connected to the driving controller 4 described above via the wiring line and the electrode pad.

A driving voltage is applied to the upper electrode 53 from the driving controller 4. The lower electrode 51 is connected to the driving controller 4 via the wiring line and the electrode pad, and a reference potential (for example, a ground potential) is applied thereto.

In a case where a positive or negative voltage is applied to the piezoelectric film 52 in the polarization direction, deformation (for example, expansion and contraction) proportional to the applied voltage occurs. That is, the piezoelectric film 52 exerts a so-called inverse piezoelectric effect. The piezoelectric film 52 exerts an inverse piezoelectric effect by applying a driving voltage from the driving controller 4 to the upper electrode 53, and displaces the first actuator 24 and the second actuator 25.

Figure 7:
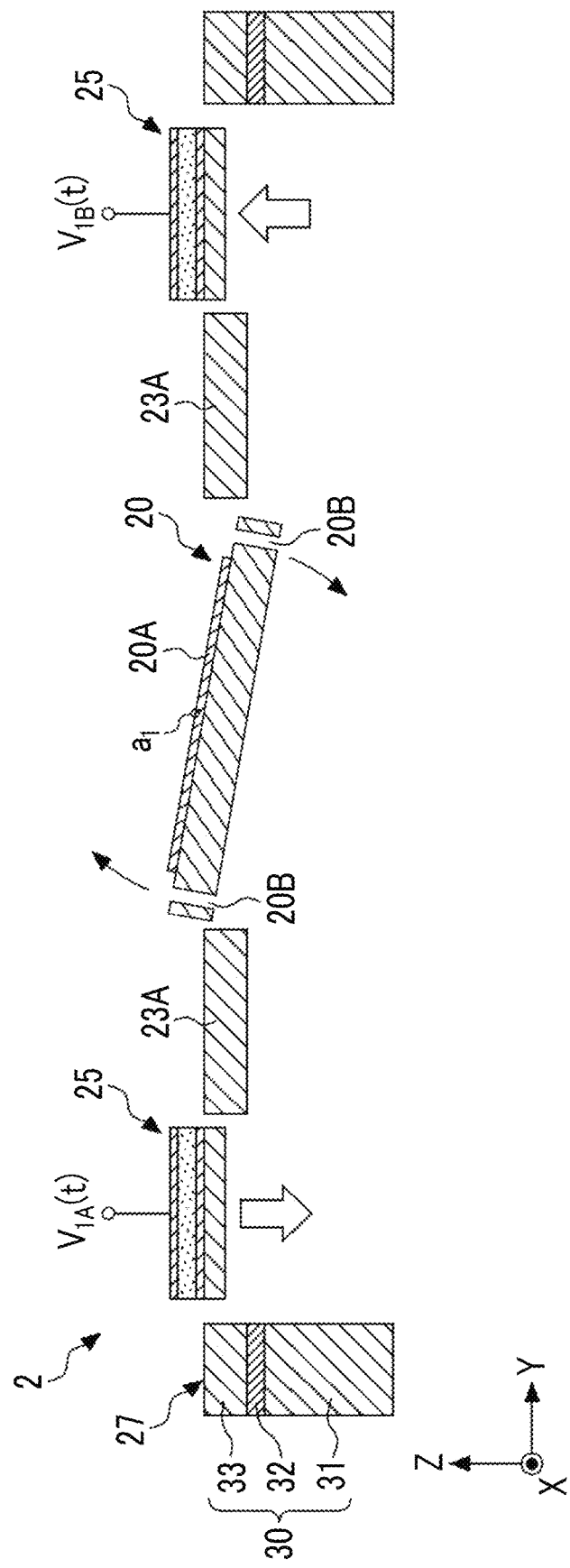
FIG. 7 is a diagram showing an example of driving a second actuator.

FIG. 7 shows an example in which one piezoelectric film 52 of the pair of second actuators 25 is extended and the other piezoelectric film 52 is contracted, thereby generating rotational torque around the first axis $a_1$ in the second actuator 25. In this way, one of the pair of second actuators 25 and the other are displaced in opposite directions to each other, whereby the mirror portion 20 rotates around the first axis $a_1$.

In addition, FIG. 7 shows an example in which the second actuator 25 is driven in an anti-phase resonance mode in which the displacement direction of the pair of second actuators 25 and the rotation direction of the mirror portion 20 are opposite to each other. The second actuator 25 may be driven in an in-phase resonance mode in which the displacement direction of the pair of second actuators 25 and the rotation direction of the mirror portion 20 are the same direction.

A deflection angle of the mirror portion 20 around the first axis $a_1$ is controlled by the driving signal (hereinafter, referred to as a first driving signal) given to the second actuator 25 by the driving controller 4. The first driving signal is, for example, a sinusoidal AC voltage. The first driving signal includes a driving voltage waveform $V_{1A}(t)$ applied to one of the pair of second actuators 25 and a driving voltage waveform $V_{1B}(t)$ applied to the other. The driving voltage waveform $V_{1A}(t)$ and the driving voltage waveform $V_{1B}$ (t) are in an anti-phase with each other (that is, the phase difference is 180°).

The deflection angle of the mirror portion 20 around the first axis $a_1$ means an angle at which the normal line of the reflecting surface 20A is inclined with respect to the Z direction in a YZ plane.

Figure 8:
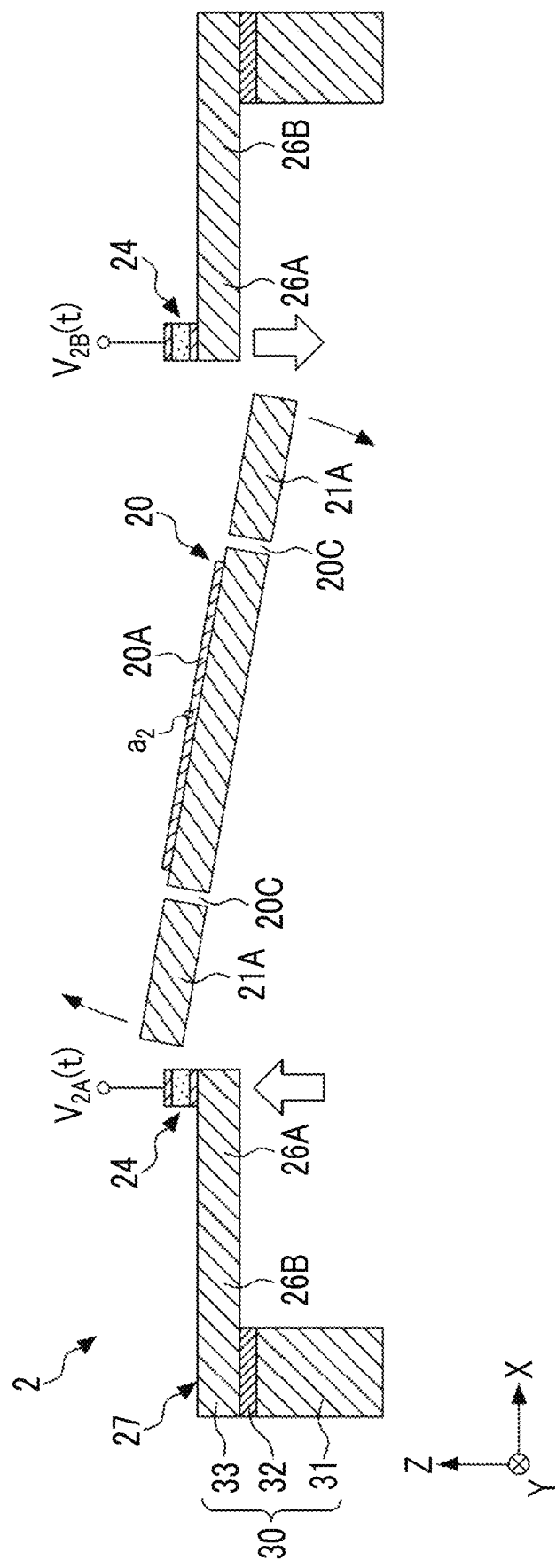
FIG. 8 is a diagram showing an example of driving a first actuator.

FIG. 8 shows an example in which one piezoelectric film 52 of the pair of first actuators 24 is extended and the other piezoelectric film 52 is contracted, thereby generating rotational torque around the second axis $a_2$ in the first actuator 24. In this way, one of the pair of first actuators 24 and the other are displaced in opposite directions to each other, whereby the mirror portion 20 rotates around the second axis $a_2$.

In addition, FIG. 8 shows an example in which the first actuator 24 is driven in an in-phase resonance mode in which the displacement direction of the pair of first actuators 24 and the rotation direction of the mirror portion 20 are the same direction. The first actuator 24 may be driven in an anti-phase resonance mode in which the displacement direction of the pair of first actuators 24 and the rotation direction of the mirror portion 20 are opposite to each other.

A deflection angle of the mirror portion 20 around the second axis $a_2$ is controlled by the driving signal (hereinafter, referred to as a second driving signal) given to the first actuator 24 by the driving controller 4. The second driving signal is, for example, a sinusoidal AC voltage. The second driving signal includes a driving voltage waveform $V_{2A}$ (t) applied to one of the pair of first actuators 24 and a driving voltage waveform $V_{2B}$ (t) applied to the other. The driving voltage waveform $V_{2A}$ (t) and the driving voltage waveform $V_{2B}$ (t) are in an anti-phase with each other (that is, the phase difference is 180°).

The deflection angle of the mirror portion 20 around the second axis $a_2$ means an angle at which the normal line of the reflecting surface 20A is inclined with respect to the Z direction in a XZ plane.

Figure 9:
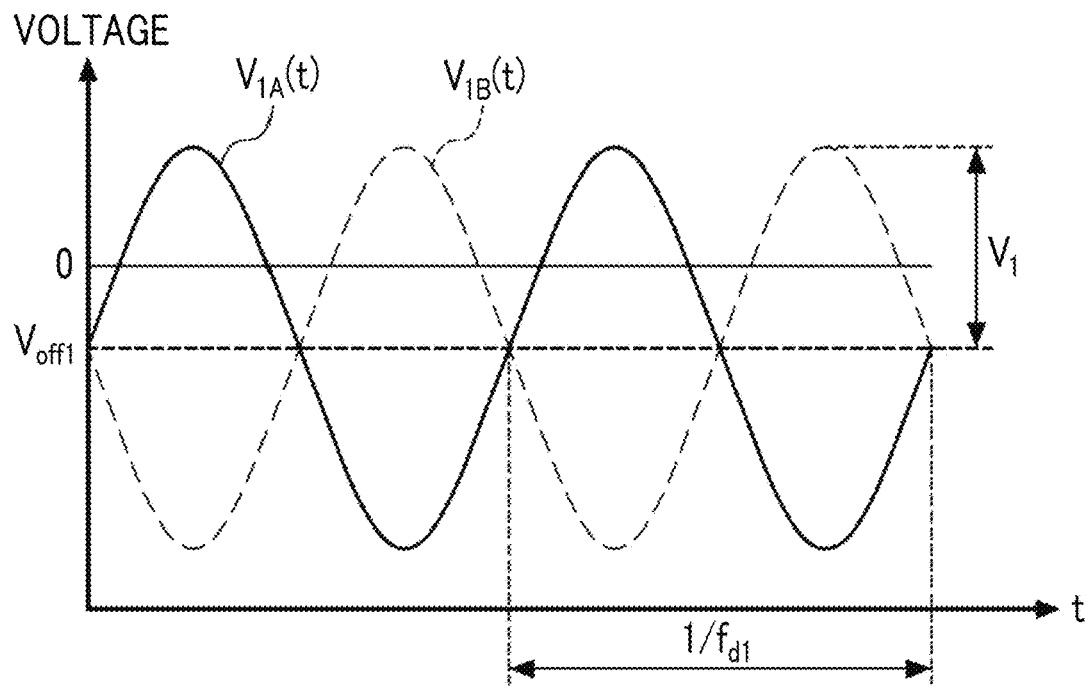
FIG. 9 is a diagram showing an example of a first driving signal.
Figure 10:
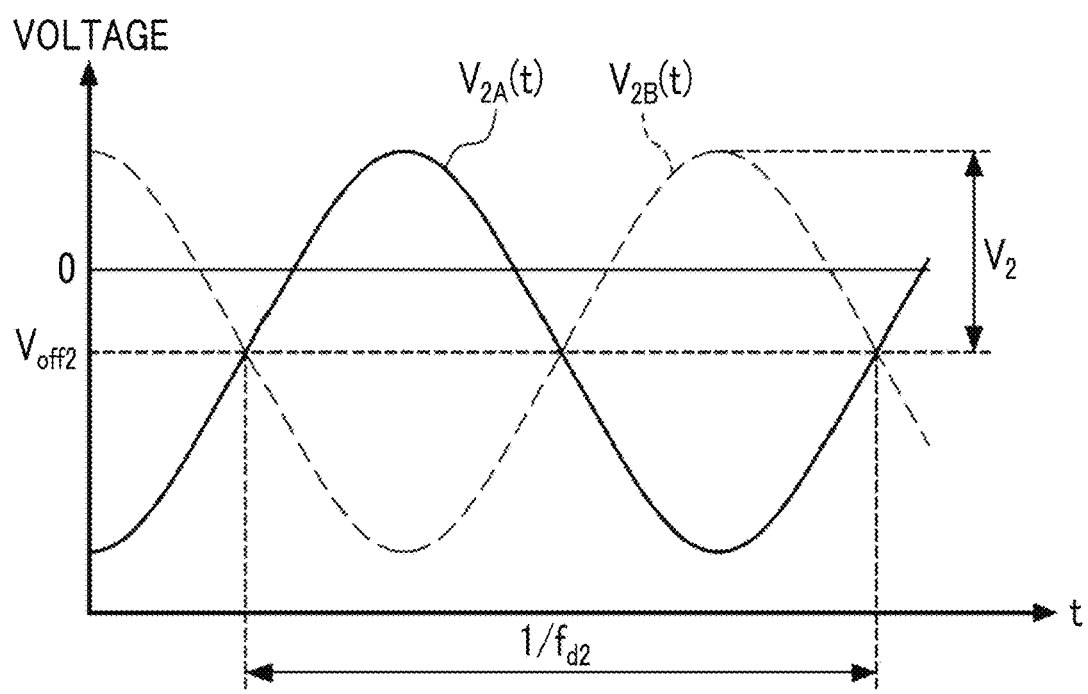
FIG. 10 is a diagram showing an example of a second driving signal.

FIGS. 9 and 10 show examples of the first driving signal and the second driving signal. FIG. 9 shows the driving voltage waveforms $V_{1A}$ (t) and $V_{1B}$ (t) included in the first driving signal. FIG. 10 shows the driving voltage waveforms $V_{2A}$ (t) and $V_{2B}$ (t) included in the second driving signal.

The driving voltage waveforms $V_{1A}$ (t) and $V_{1B}$ (t) are represented as follows, respectively.

$$V_{1A}(t)=V_{off1}+V_1 \sin(2\pi f_{d1}t)$$

$$V_{1B}(t)=V_{off1}+V_1 \sin(2\pi f_{d1}t+\alpha)$$

Here, $V_1$ is the amplitude voltage. $V_{off1}$ is the bias voltage. $f_{d1}$ is the driving frequency (hereinafter, referred to as the first driving frequency). t is time. α is the phase difference between the driving voltage waveforms $V_{1A}$ (t) and $V_{1B}$ (t). In the present embodiment, for example, α=180°.

By applying the driving voltage waveforms $V_{1A}$ (t) and $V_{1B}$ (t) to the pair of second actuators 25, the mirror portion 20 swings around the first axis $a_1$ at the first driving frequency $f_{d1}$ (see FIG. 7).

The driving voltage waveforms $V_{2A}$ (t) and $V_{2B}$ (t) are represented as follows, respectively.

$$V_{2A}(t)=V_{off2}+V_2 \sin(2\pi f_{d2}t+\varphi)$$

$$V_{2A}(t)=V_{off2}+V_2 \sin(2\pi f_{d2}t+\beta+\varphi)$$

Here, $V_2$ is the amplitude voltage. $V_{off2}$ is the bias voltage. $f_{d2}$ is the driving frequency (hereinafter, referred to as the second driving frequency). t is time. β is the phase difference between the driving voltage waveforms $V_{2A}$ (t) and $V_{2B}$ (t).

In the present embodiment, for example, β=180°. In addition, φ is the phase difference between the driving voltage waveforms $V_{1A}$ (t) and $V_{1B}$ (t) and the driving voltage waveforms $V_{2A}$ (t) and $V_{2B}$ (t). In the present embodiment, for example, $V_{off1}=V_{off2}=0$ V.

By applying the driving voltage waveforms $V_{2A}$ (t) and $V_{2B}$ (t) to the pair of first actuators 24, the mirror portion 20 swings around the second axis $a_2$ at the second driving frequency $f_{d2}$ (see FIG. 8).

The first driving frequency $f_{d1}$ is set so as to match the resonance frequency around the first axis $a_1$ of the mirror portion 20 (hereinafter, referred to as a first resonance frequency). The second driving frequency $f_{d2}$ is set so as to match the resonance frequency around the second axis $a_2$ of the mirror portion 20 (hereinafter, referred to as a second resonance frequency). In the present embodiment, $f_{d1}>f_{d2}$. That is, in the mirror portion 20, a swing frequency around the first axis $a_1$ is higher than a swing frequency around the second axis $a_2$. The first driving frequency $f_{d1}$ and the second driving frequency $f_{d2}$ do not necessarily have to match the resonance frequency. For example, the first driving frequency $f_{d1}$ and the second driving frequency $f_{d2}$ may be frequencies within a frequency range in the vicinity of the resonance frequency (for example, a range of half-width of frequency distribution having the resonance frequency as a peak value).

A plurality of resonance modes having different orders exist for the resonance of the mirror portion 20 in addition to the above-described phase (in-phase or anti-phase). For example, the first driving frequency $f_{d1}$ is set to a value matching a resonance frequency of the resonance mode in which the largest deflection angle is obtained in the anti-phase resonance mode group around the first axis $a_1$. In the present embodiment, for example, the first driving frequency $f_{d1}$ is matched with a resonance frequency of the second lowest-order resonance mode in the anti-phase resonance mode group. Hereinafter, the resonance mode around the first axis $a_1$ is referred to as a high-speed scan mode.

In addition, for example, the second driving frequency $f_{d2}$ is set to a value matching a resonance frequency of the resonance mode in which the largest deflection angle is obtained in the in-phase resonance mode group around the second axis $a_2$. In the present embodiment, for example, the second driving frequency $f_{d2}$ is matched with a resonance frequency of the second lowest-order resonance mode in the in-phase resonance mode group. Hereinafter, the resonance mode around the second axis $a_2$ is referred to as a low-speed scan mode.

The order of the resonance mode in which the largest deflection angle is obtained changes depending on a shape or the like of the first actuator 24 and the second actuator 25. Therefore, the first driving frequency $f_{d1}$ and the second driving frequency $f_{d2}$ may be matched with frequencies of resonance modes of other orders, respectively.

Figure 11:
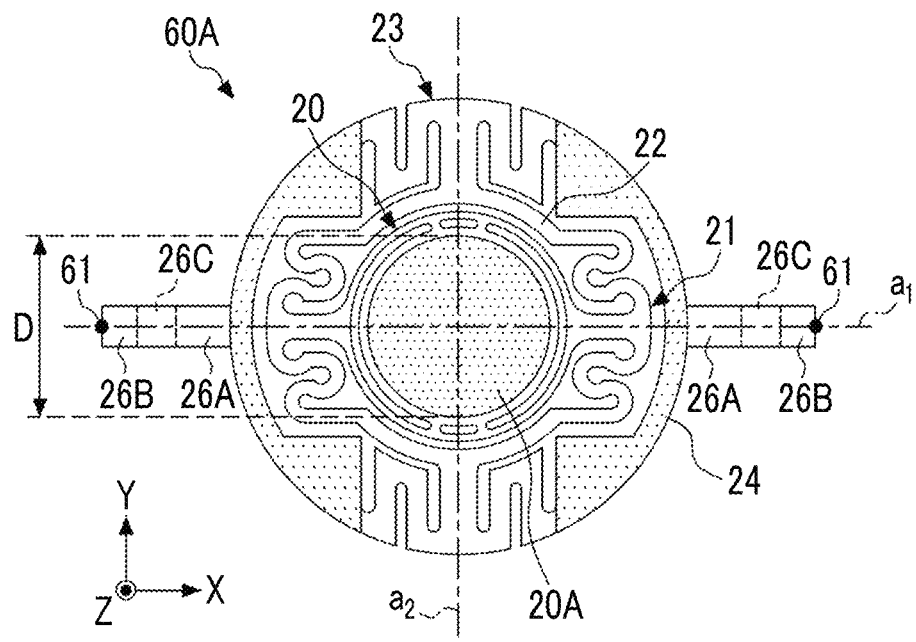
FIG. 11 is a plan view showing a first structural portion.

Next, the resonance mode around the first axis $a_1$ will be described. FIG. 11 shows a first structural portion 60A, which is a structural portion of a part of the MMD 2. The first structural portion 60A includes a mirror portion 20, a first support portion 21, a movable frame 22, a second support portion 23, a first actuator 24, a first connecting portion 26A, a virtual extension portion 26C, and a second connecting portion 26B. The virtual extension portion 26C is configured in which the first connecting portion 26A is virtually extended along the first axis $a_1$ to an end part 25B (see FIG. 13) of the second actuator 25 on a side opposite to the mirror portion 20. The second connecting portion 26B of the present embodiment is an example of a "second A connecting portion" according to the technique of the present disclosure. The second A connecting portion connects the fixed frame 27 and the second actuator 25 on the same axis as the first connecting portion 26A.

Figure 12:
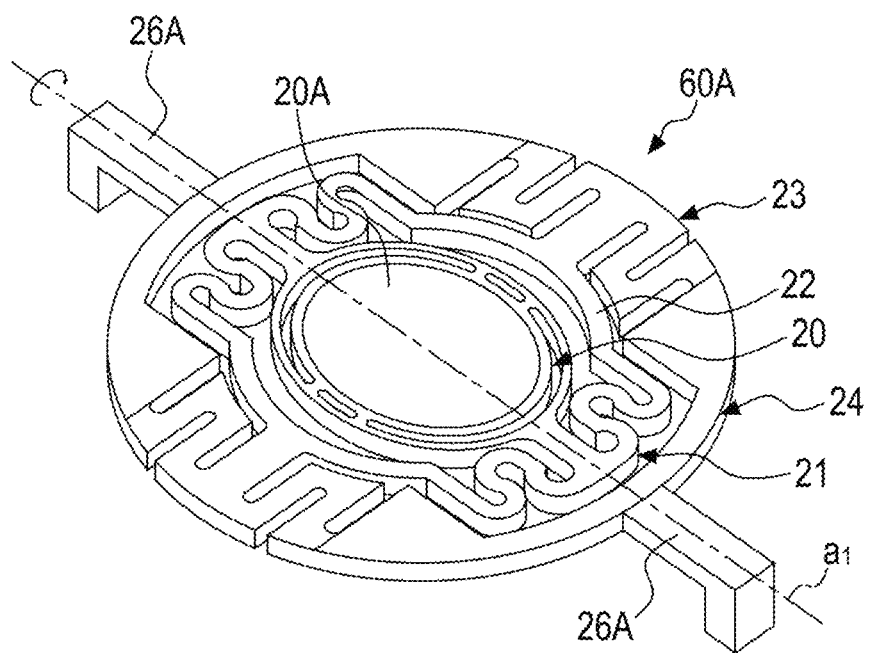
FIG. 12 is a diagram showing an example of a resonance mode in which only the first structural portion is targeted.

FIG. 12 shows an example of a resonance mode in which only the first structural portion 60A is targeted. Specifically, FIG. 12 shows a resonance mode in which the mirror portion 20 swings around the first axis $a_1$ (hereinafter, referred to as a first resonance mode) among resonance modes of the first structural portion 60A in a case where an end part 61 (see FIG. 11) of the second connecting portion 26B on the fixed frame 27 side is fixed.

Figure 13:
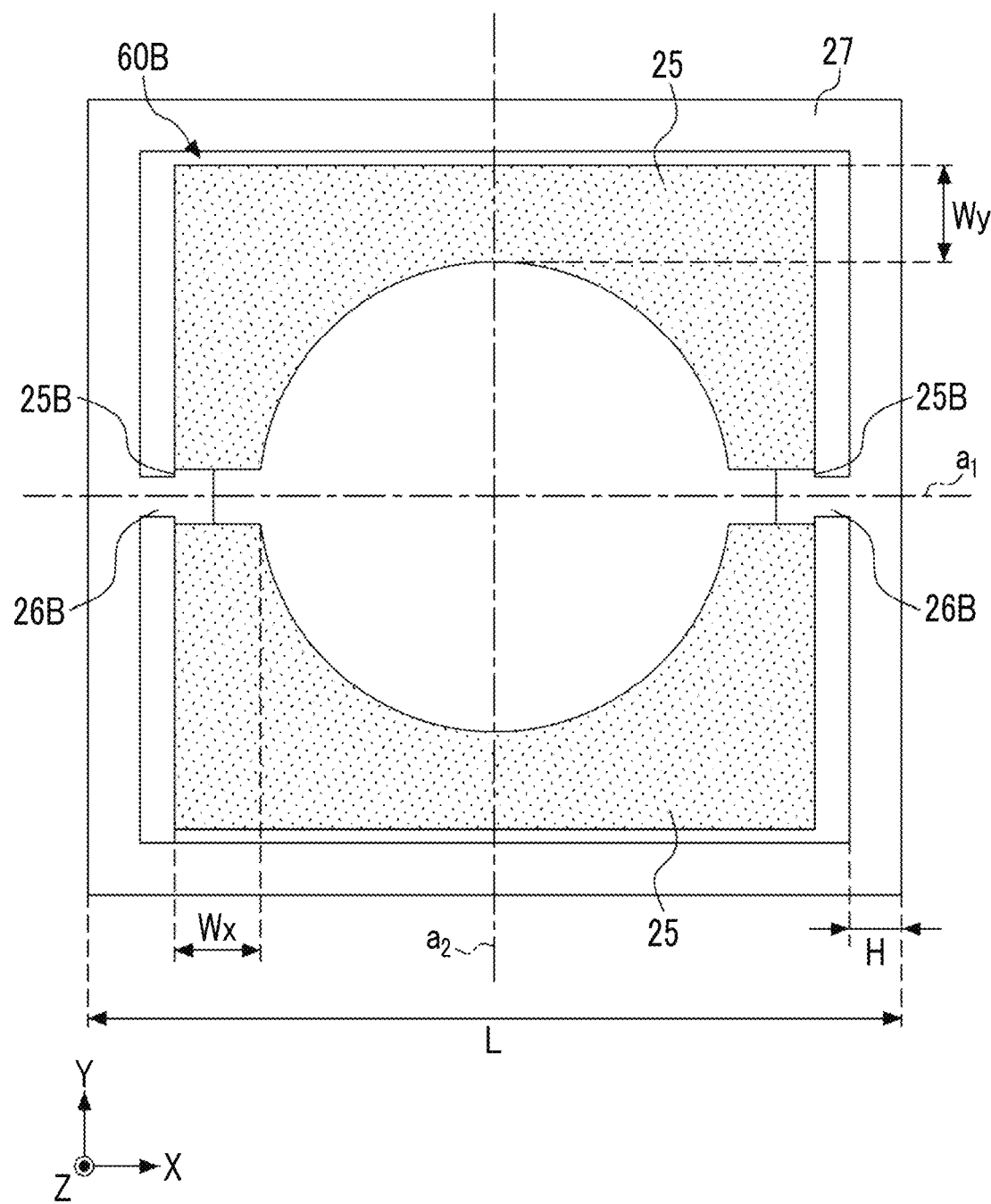
FIG. 13 is a plan view showing a second structural portion.

FIG. 13 shows a second structural portion 60B, which is a structural portion of a part of the MMD 2. The second structural portion 60B includes a second actuator 25 and a second connecting portion 26B.

Figure 14:
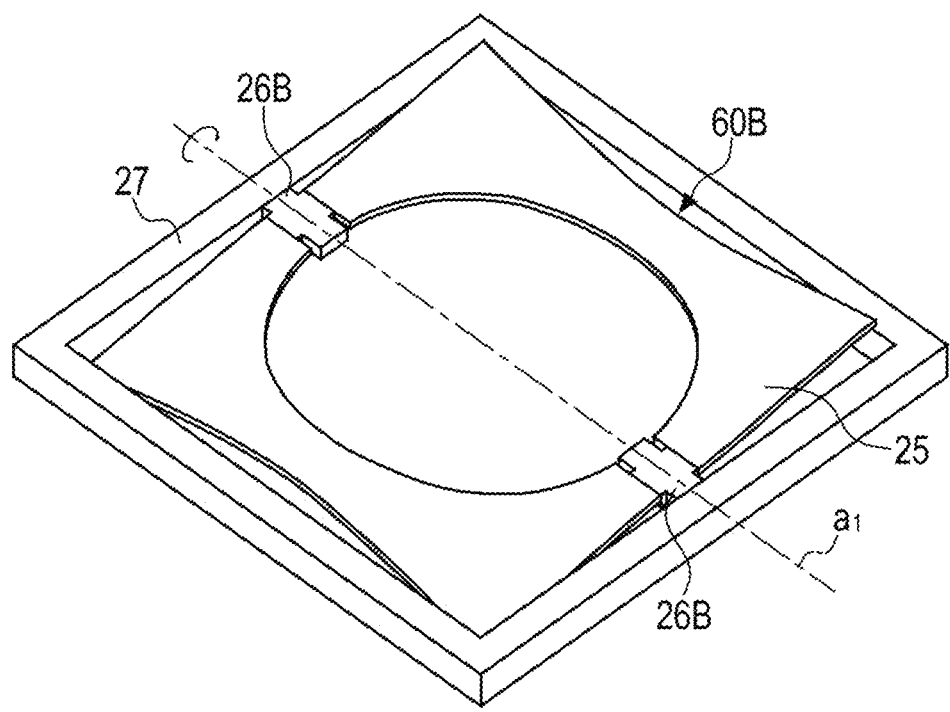
FIG. 14 is a diagram showing an example of a resonance mode in which only the second structural portion is targeted.

FIG. 14 shows an example of a resonance mode in which only the second structural portion 60B is targeted. Specifically, FIG. 14 shows a resonance mode in which the first axis $a_1$ is located in a vibration node and displacement distribution in an out-of-plane direction (that is, plate thickness direction) of the second actuator 25 with respect to the first axis $a_1$ is symmetrical (hereinafter, referred to as a second resonance mode) among resonance modes of the second structural portion 60B in a case where the fixed frame 27 side of the second connecting portion 26B is fixed. In FIG. 14, the displacement distribution in the out-of-plane direction of the second actuator 25 is rotationally symmetric with respect to the first axis $a_1$.

A resonance frequency of the first resonance mode (see FIG. 12) in which only the first structural portion 60A is targeted and the mirror portion 20 swings around the first axis $a_1$ is denoted by fm. In addition, a resonance frequency of the second resonance mode (see FIG. 14) in which only the second structural portion 60B is targeted and the displacement distribution in the out-of-plane direction of the second actuator 25 with respect to the first axis $a_1$ is symmetrical is denoted by fa.

The present applicant has found that the closer the resonance frequency fm of the first resonance mode is to the resonance frequency fa of the second resonance mode, the larger the maximum value of the deflection angle (hereinafter, referred to as the maximum deflection angle) θm of the mirror portion 20 around the first axis $a_1$. Specifically, it is preferable that the resonance frequencies fm and fa satisfy a relationship of Equation (1), in order to increase the maximum deflection angle θm.

$$-0.03 \leq \Delta f/fm \leq 0.03 \quad (1)$$

Here, Δf is a difference between the resonance frequency fm and the resonance frequency fa, and is expressed as Δf=fm−fa. Δf/fm is a matching rate indicating a degree of matching between the resonance frequency fm and the resonance frequency fa.

It means that even though the amplitude voltage $V_1$ of the first driving signal is constant, the maximum deflection angle θm is maximized in a case where the resonance frequencies fm and fa satisfy Equation (1), that is, in a case where a relationship of |fm−fa|/fm≤0.03 is satisfied. By increasing the maximum deflection angle θm, a scan angle of the light beam L reflected by the mirror portion 20 can be increased.

Since there are a plurality of candidate modes for each of the first resonance mode and the second resonance mode, it is preferable to select an appropriate mode from among these modes in consideration of a target driving frequency, stability, displacement amount, and the like.

Example 1

Next, a simulation result performed for confirming Equation (1) will be described as Example 1. The present applicant has examined a relationship between the matching rate Δf/fm and the maximum deflection angle θm while changing dimensions of the MMD 2 by vibration analysis simulation by a finite element method.

(Dimensions of MMD)

First, the dimensions of the MMD 2 used in the present example will be described. In FIG. 13, Wx represents a width of the second actuator 25 in the vicinity of the first axis $a_1$ in the X direction. Wy represents a width of the second actuator 25 on the second axis $a_2$ in the Y direction. L represents a length of one side of the fixed frame 27. The length L of one side of the fixed frame 27 is equal in the X direction and the Y direction.

H represents a width of the fixed frame 27. The width H of the fixed frame 27 is equal in the X direction and the Y direction. In addition, in FIG. 11, D represents a diameter of the reflecting surface 20A of the mirror portion 20. In the present example, the diameter D and the width H are fixed values. Specifically, D=1.5 mm and H=0.5 mm.

In the present example, the widths Wx and Wy were changed as parameters. The length L is a value changing in association with changes in the widths Wx and Wy.

Figure 15:
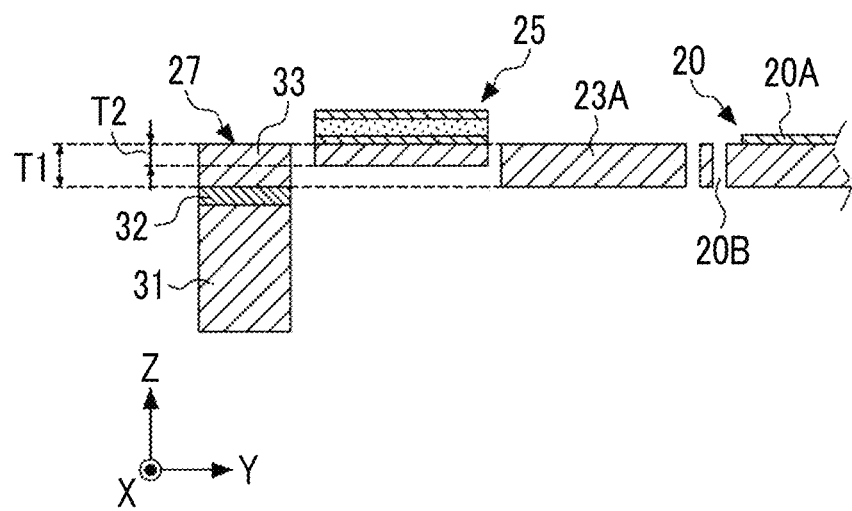
FIG. 15 is a cross-sectional view illustrating dimensions of the micromirror device.

FIG. 15 is a cross-sectional view showing a thickness of the MMD 2. In FIG. 15, T1 represents a thickness of the first structural portion 60A (see FIG. 11). T2 represents a thickness of the second structural portion 60B (see FIG. 13). T1 corresponds to a thickness of the second silicon active layer 33 constituting the first actuator 24 and the mirror portion 20. T2 corresponds to a thickness of the second silicon active layer 33 constituting the second actuator 25.

The present applicant created a plurality of simulation models (hereinafter, simply referred to as models) by changing the widths Wx and Wy and the thicknesses T1 and T2, and obtained the matching rate Δf/fm and the maximum deflection angle θm for each model. Here, the amplitude voltage $V_1$ of the first driving signal was set to 5 V (that is, Vpp=10 V). Vpp represents a difference between the maximum voltage and the minimum voltage of the first driving signal. In addition, the first driving frequency $f_{d1}$ was set to about 35 kHz.

FIG. 16 shows simulation results for each model. In FIG. 16, models 1 to 7 are models created by setting T1=T2 and changing the widths Wx and Wy. Regarding the models 1 to 7, the widths Wx and Wy of the model 1 are the smallest and the widths of the model 7 are the largest. Models 8 to 15 are models created by setting T1>T2 and changing the widths Wx and Wy. Regarding the models 8 to 15, the widths Wx and Wy of the model 8 are the smallest and the widths of the model 15 are the largest.

Figure 17:
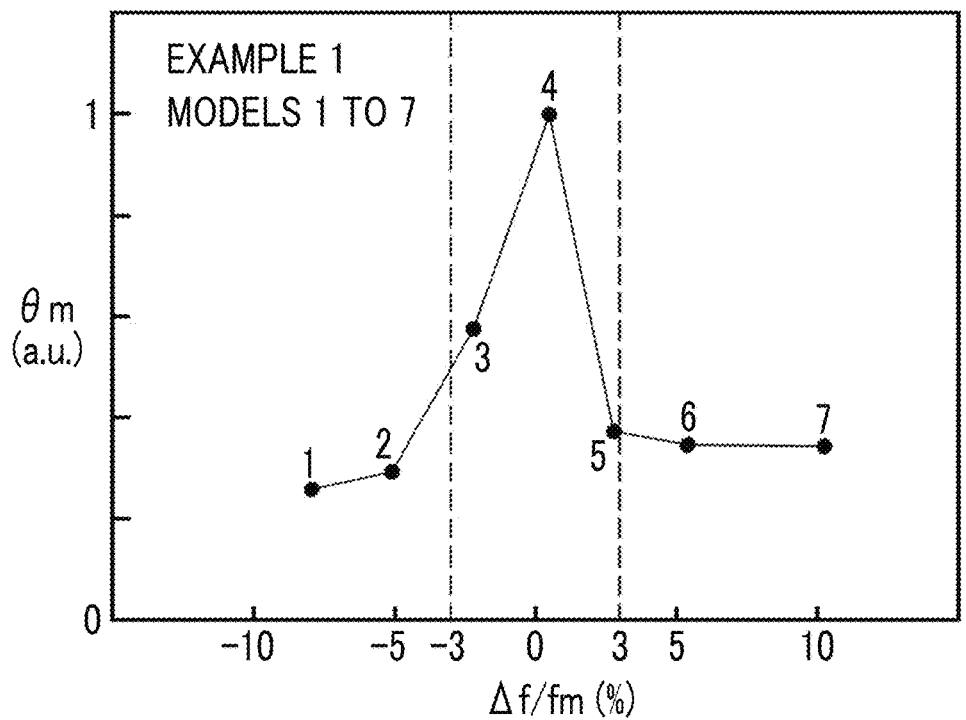
FIG. 17 is a graph showing simulation results for models 1 to 7.
Figure 18:
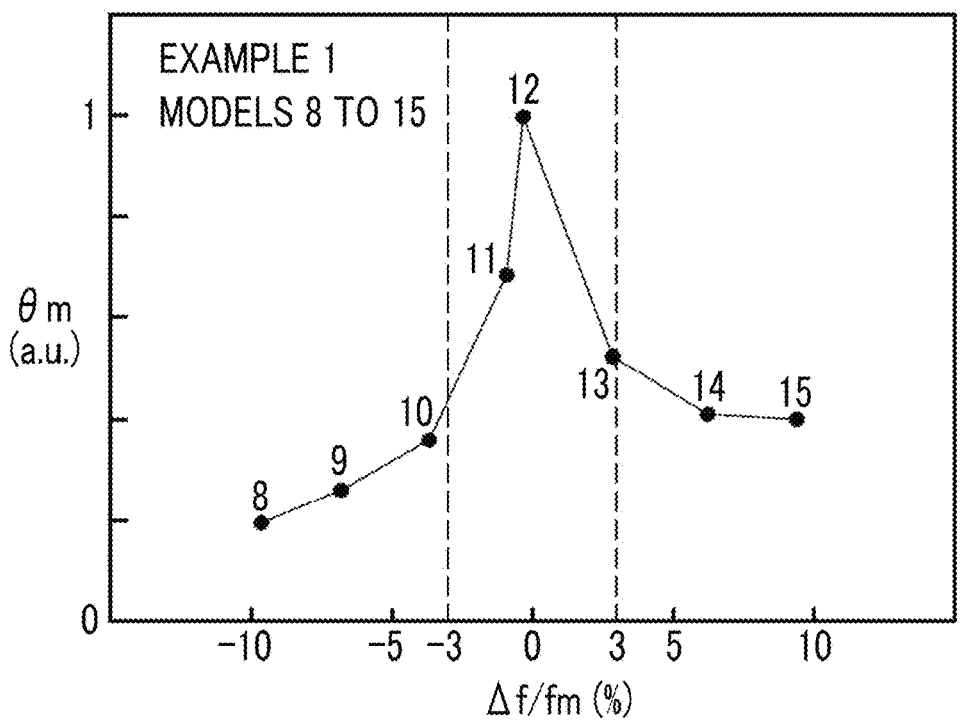
FIG. 18 is a graph showing simulation results for models 8 to 15.

FIG. 17 and FIG. 18 are graphs showing a relationship between the matching rate Δf/fm and the maximum deflection angle θm. FIG. 17 shows simulation results for the models 1 to 7. FIG. 18 shows simulation results for the models 8 to 15.

From the simulation results of FIGS. 16 to 18, it can be seen that the maximum deflection angle θm is maximized in a case where the matching rate Δf/fm satisfies Equation (1), in both a case of T1=T2 and a case of T1>T2. In addition, comparing the case where T1=T2 with the case where T1>T2, it can be seen that the widths Wx and Wy can be made smaller (that is, the size of the second actuator 25 is made smaller) in the case where T1>T2.

As described above, according to the technique of the present disclosure, the shapes of the first actuator 24 and the second actuator 25 can be made optimal for driving around the second axis $a_2$ and the first axis $a_1$, respectively, by using the MMD 2 with the above configuration. As a result, the maximum deflection angle θm of the mirror portion 20 can be set to a desired angle, and the stability of the swinging of the mirror portion 20 can be realized. More specifically, the deflection angle of the mirror portion 20 per unit amplitude voltage of the first driving signal for applying torque around the first axis $a_1$ can be freely set by changing the size of the second actuator 25 and finely adjusting the resonance frequency of the second structural portion 60B. In addition, robustness against dimensional variation can be freely designed in a wide range.

The maximum deflection angle θm around the first axis $a_1$ of the mirror portion 20 can be increased by adjusting the size of the second actuator 25 so that the matching rate Δf/fm is within the range of Equation (1). In addition, it is not necessary to increase the size of the first actuator 24 in order to increase the maximum deflection angle θm. For this reason, it is possible to suppress a decrease in the resonance frequency around the second axis $a_2$ due to an increase in weight with the increase in size of the first actuator 24. Therefore, according to the technique of the present disclosure, it is possible to increase the maximum deflection angle θm around the first axis $a_1$ without decreasing the resonance frequency around the second axis $a_2$.

In addition, from the simulation results of FIGS. 16 to 18, it can be seen that a rate of change of the maximum deflection angle θm with respect to a change of the matching rate Δf/fm is small in a case where the matching rate Δf/fm satisfies Equation (2) or (3).

$$\Delta f/fm > 0.03 \quad (2)$$

$$\Delta f/fm < -0.03 \quad (3)$$

This corresponds to the small rate of change of the maximum deflection angle θm with respect to the change of the widths Wx and Wy (that is, the change in size of the second actuator 25) in a case where the matching rate Δf/fm satisfies Equation (2) or (3), that is, in a case where the relationship of |fm−fa|/fm>0.03 is satisfied. That is, it means that in a case where the matching rate Δf/fm satisfies Equation (2) or (3), a stable deflection angle is obtained (that is, manufacturing robustness is high) even though an error occurs in the size of the second actuator 25 due to an error in a manufacturing process or the like.

Whether the matching rate Δf/fm is designed to satisfy any of Equations (1) to (3) can be freely selected according to factors such as system requirements and accuracy of the manufacturing process.

First Modification Example

Figure 19:
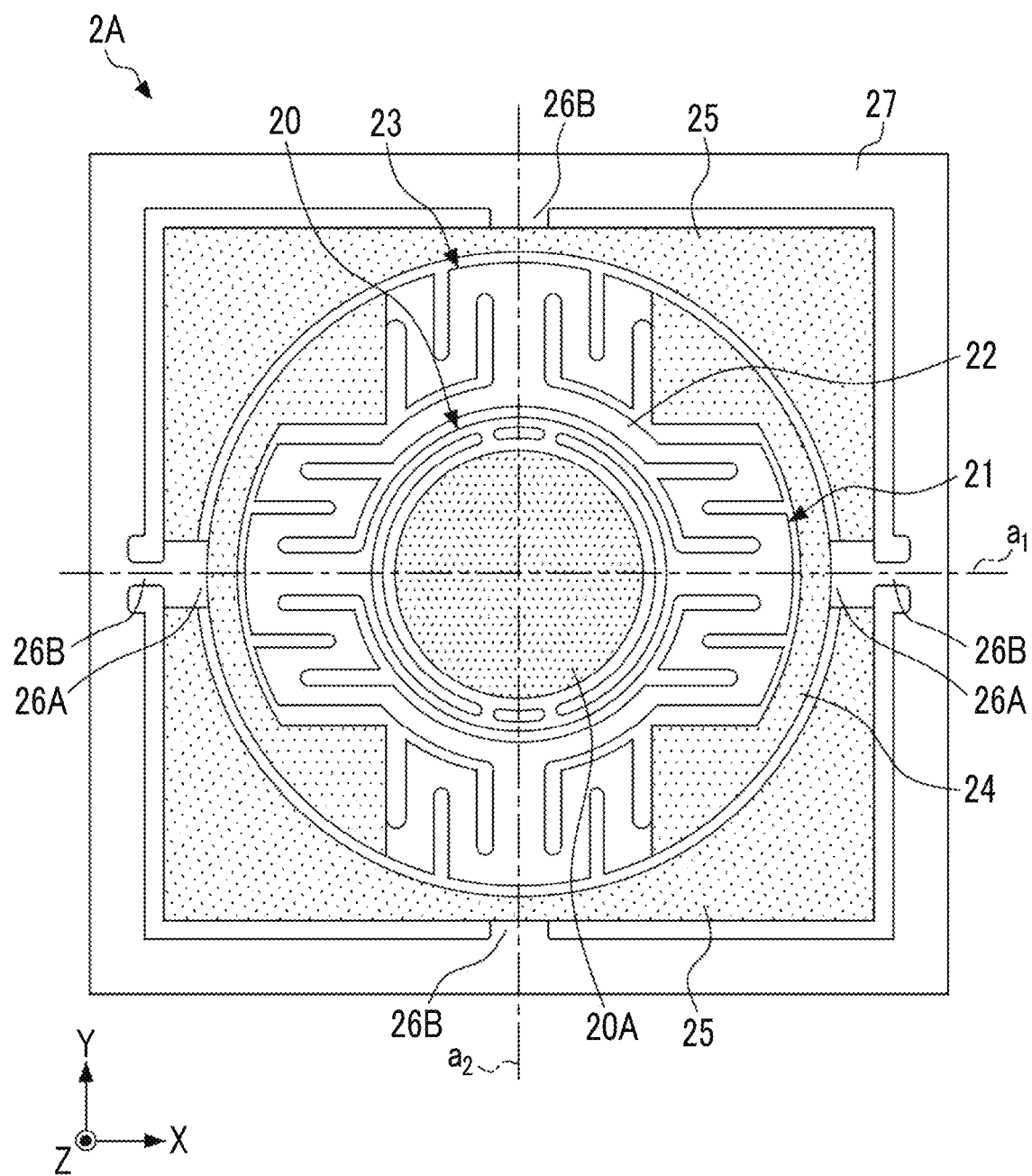
FIG. 19 is a plan view of a micromirror device according to a first modification example.

Next, a first modification example of the micromirror device will be described. FIG. 19 shows an MMD 2A according to the first modification example. In the MMD 2A, the shape of the first support portion 21 is different from the shape of the first support portion 21 of the MMD 2 according to the first embodiment. The shape of the first support portion 21 of the MMD 2A is the same as the shape of the second support portion 23.

In the MMD 2A according to the first modification example, the second connecting portion 26B is provided in the vicinity of the first axis $a_1$ and in the vicinity of the second axis $a_2$. That is, the pair of second connecting portions 26B are disposed at positions facing each other across the second axis $a_2$, and the pair of second connecting portions 26B are disposed at positions facing each other across the first axis $a_1$. The second connecting portion 26B connects the second actuator 25 and the fixed frame 27 on the first axis $a_1$ and the second axis $a_2$. In the first modification example, the pair of second connecting portions 26B disposed at positions facing each other across the second axis $a_2$ are an example of a "second A connecting portion" according to the technique of the present disclosure.

Figure 20:
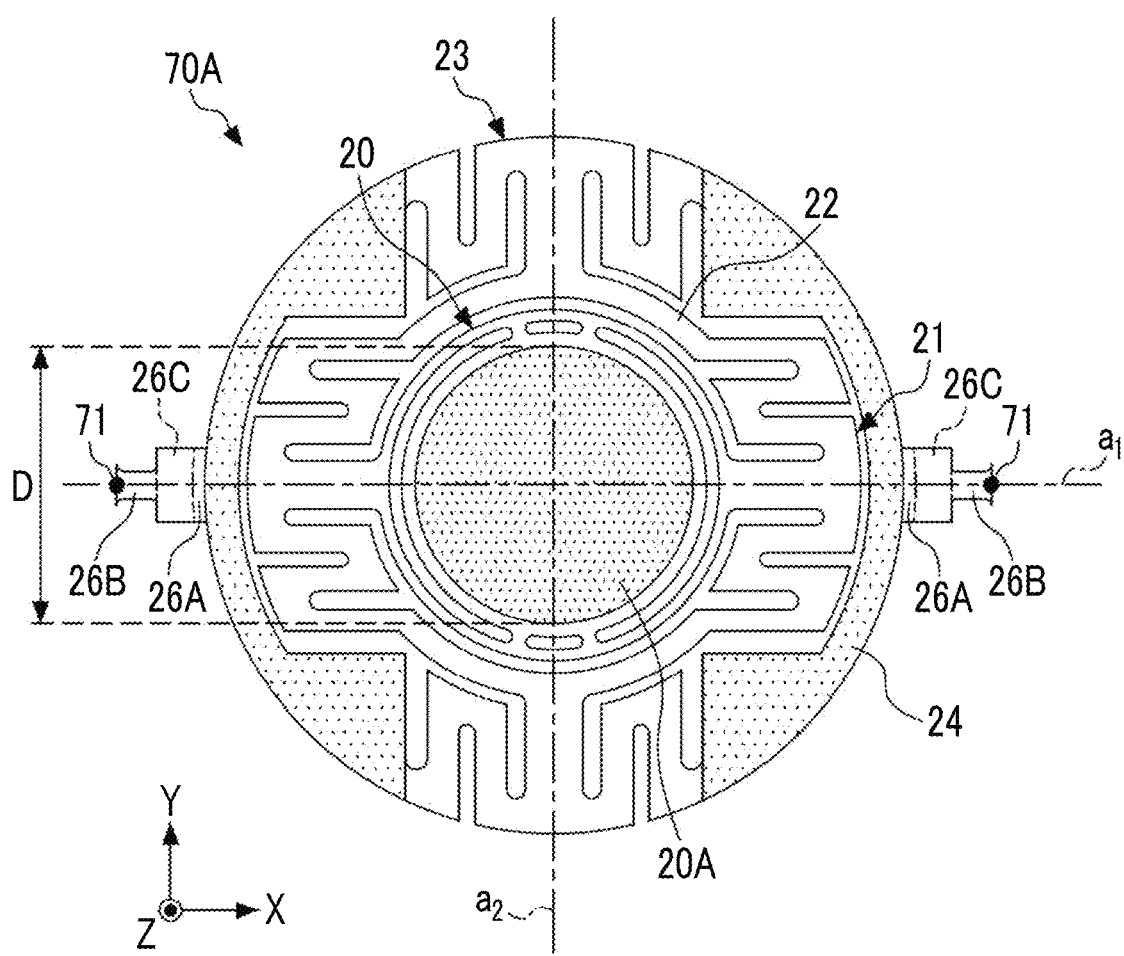
FIG. 20 is a plan view showing a first structural portion according to the first modification example.

FIG. 20 shows a first structural portion 70A according to the first modification example. The configuration of the first structural portion 70A is the same as the configuration of the first structural portion 60A according to the first embodiment. In FIG. 20, reference numeral 71 indicates an end part of the second connecting portion 26B on the fixed frame 27 side, which is fixed in a case where the first structural portion 70A resonates in the first resonance mode described above.

Figure 21:
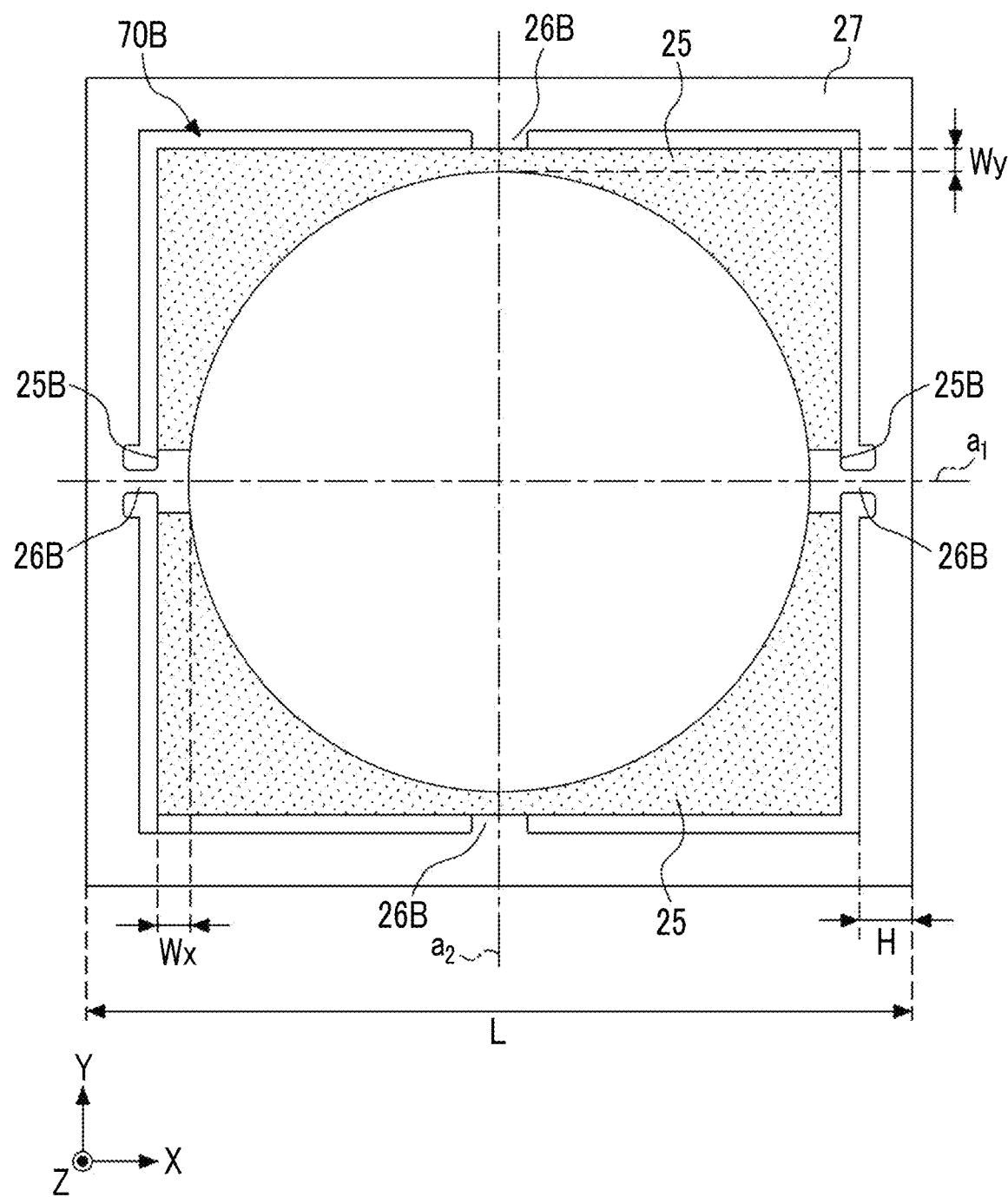
FIG. 21 is a plan view showing a second structural portion according to the first modification example.

FIG. 21 shows a second structural portion 70B according to the first modification example. The second structural portion 70B is different from the second structural portion 60B according to the first embodiment in that the second connecting portion 26B is provided in the vicinity of the first axis $a_1$ and the vicinity of the second axis $a_2$. Even in the present modification example, the second structural portion 60B is resonantly driven by fixing the fixed frame 27 side of the second connecting portion 26B provided in the vicinity of the first axis $a_1$.

Example 2

The present applicant performed the same vibration analysis simulation as in Example 1 for the MMD 2A according to the first modification example. Dimensions of the MMD 2A are the same as the dimensions of the MMD 2 according to the first embodiment.

FIG. 22 shows simulation results for each model. In FIG. 22, models 16 to 23 are models created by setting T1=T2 and changing the widths Wx and Wy. The widths Wx and Wy of the model 16 are the smallest and the widths of the model 23 are the largest.

Figure 23:
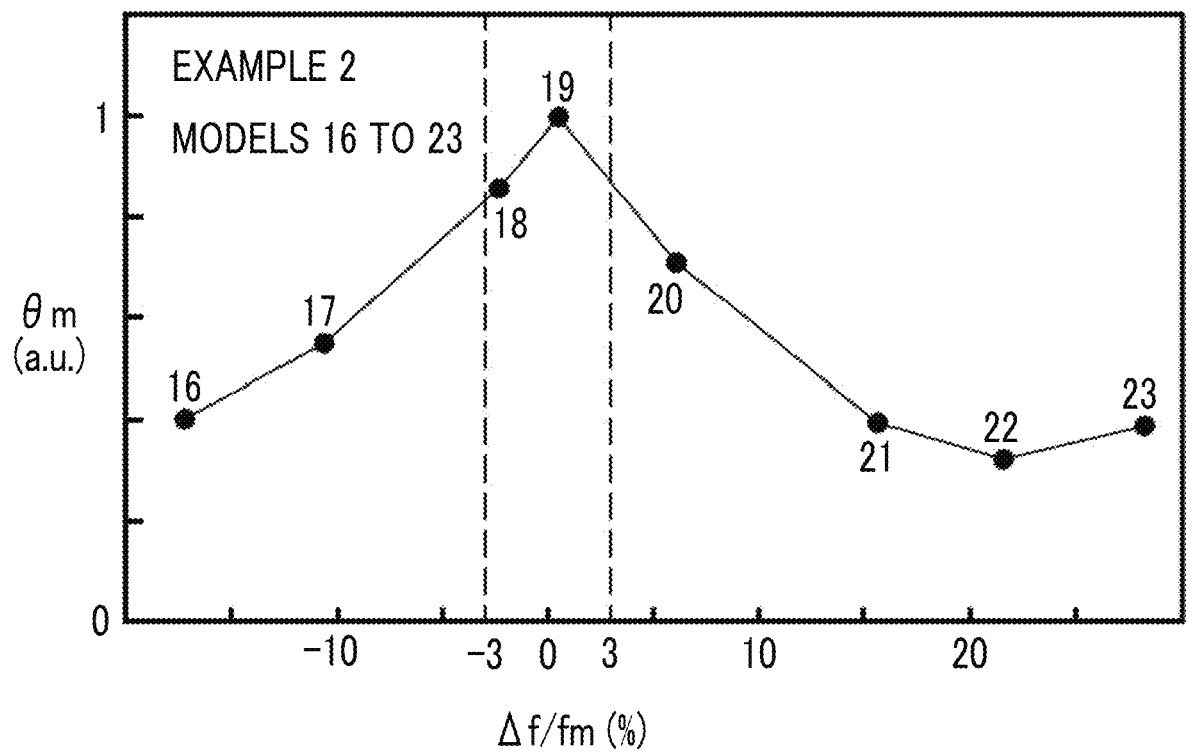
FIG. 23 is a graph showing simulation results for models 16 to 23.

FIG. 23 is a graph showing a relationship between the matching rate Δf/fm and the maximum deflection angle θm. From FIG. 23, it can be seen that the maximum deflection angle θm is maximized in a case where the matching rate Δf/fm satisfies Equation (1). In addition, it can be seen that the manufacturing robustness is improved in a case where the matching rate Δf/fm satisfies Equation (2) or (3).

Second Modification Example

Figure 24:
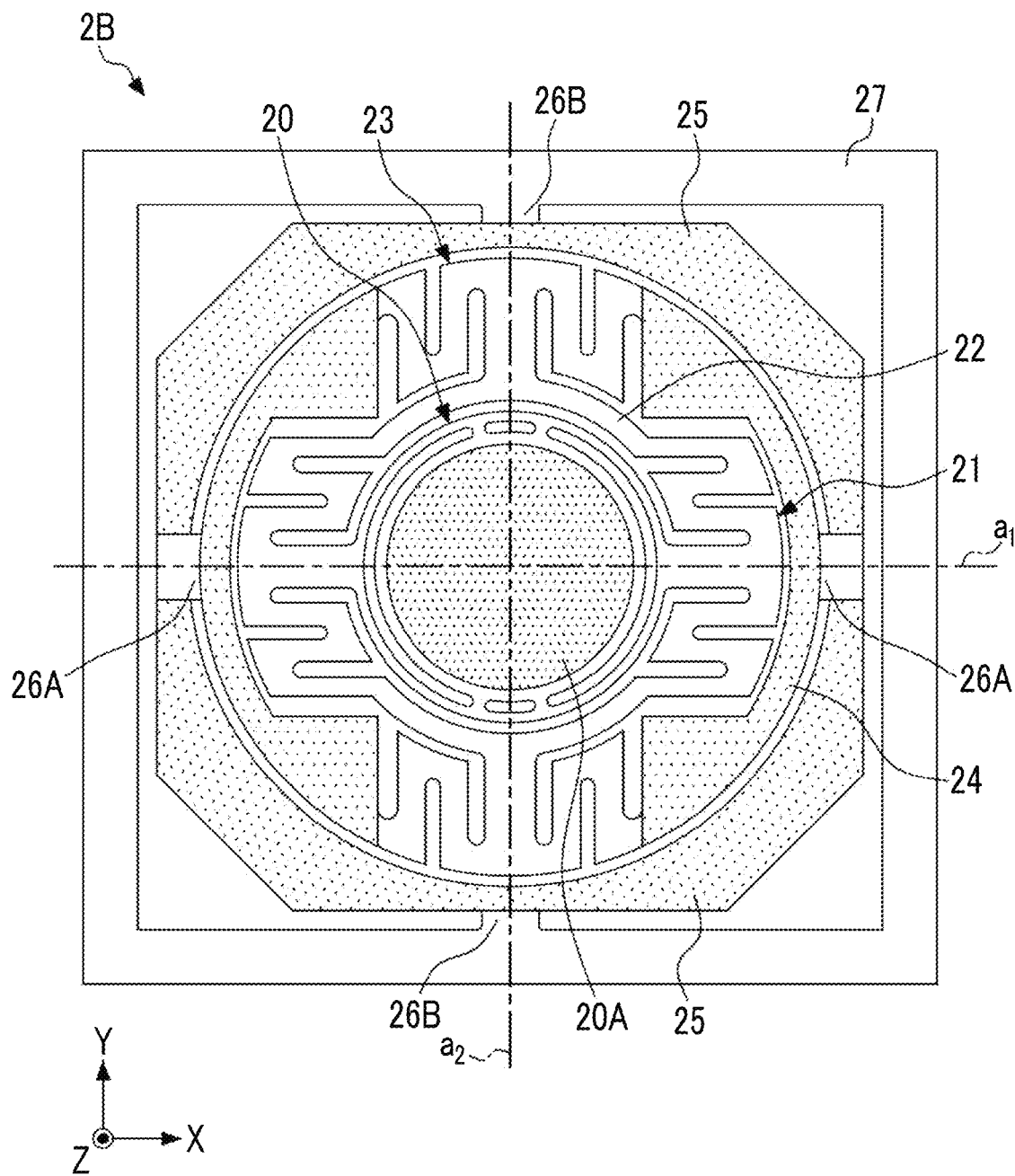
FIG. 24 is a plan view of a micromirror device according to a second modification example.

Next, a second modification example of the micromirror device will be described. FIG. 24 shows an MMD 2B according to the second modification example. In the MMD 2B, each corner portion of the second actuator 25 is notched at an angle of 45° with the X direction and the Y direction. The shape of the first support portion 21 is the same as the shape of the first support portion 21 of the MMD 2A according to the first modification example.

In the MMD 2B according to the second modification example, the second connecting portion 26B is provided only in the vicinity of the second axis $a_2$. That is, the pair of second connecting portions 26B are disposed at positions facing each other across the first axis $a_1$. The second connecting portion 26B connects the second actuator 25 and the fixed frame 27 on the second axis $a_2$. In the second modification example, the second connecting portion 26B is an example of a "second B connecting portion" that connects the fixed frame 27 and the second actuator 25 in the vicinity of an axis orthogonal to the axis on which the first connecting portion 26A is disposed.

Figure 25:
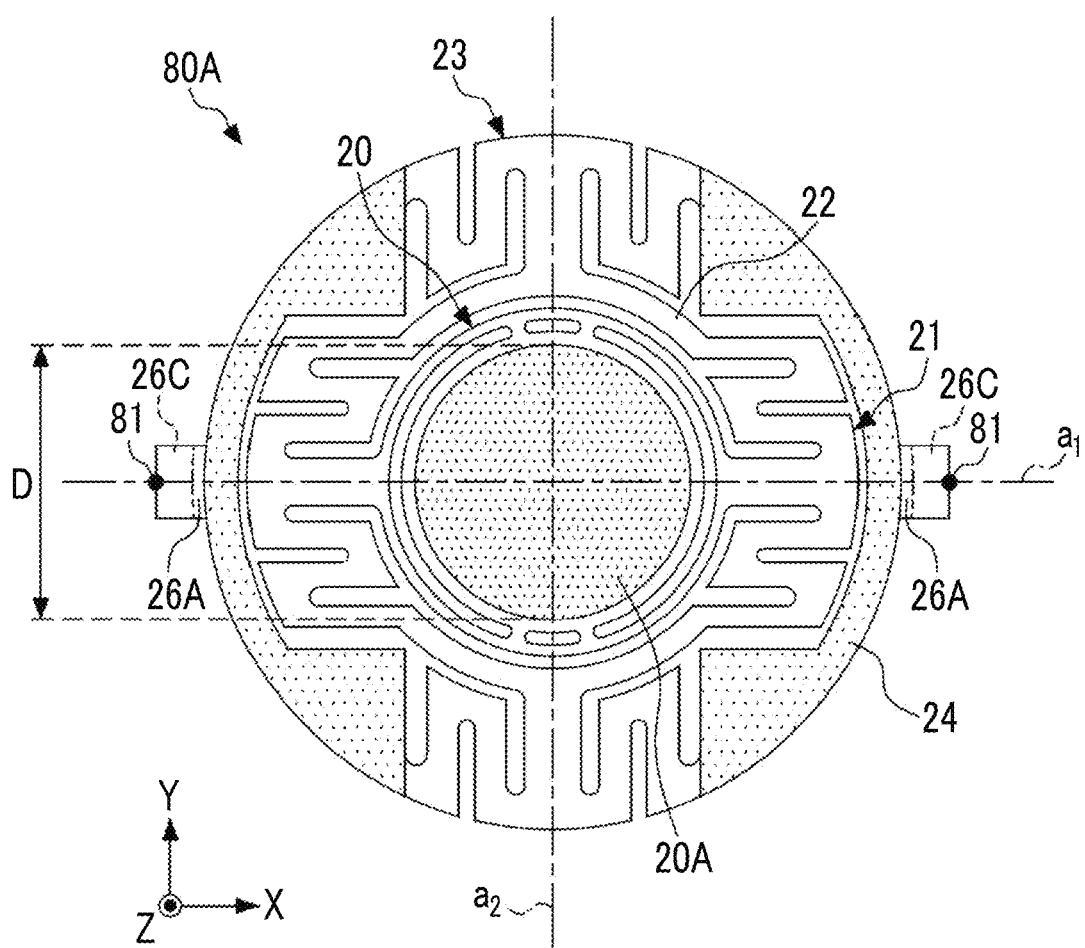
FIG. 25 is a plan view showing a first structural portion according to the second modification example.

FIG. 25 shows a first structural portion 80A according to the second modification example. The first structural portion 80A includes a mirror portion 20, a first support portion 21, a movable frame 22, a second support portion 23, a first actuator 24, a first connecting portion 26A, and a virtual extension portion 26C. The virtual extension portion 26C is configured in which the first connecting portion 26A is extended along the first axis $a_1$ to an end part 25B (see FIG. 26) of the second actuator 25 on a side opposite to the mirror portion 20. In FIG. 25, reference numeral 81 indicates an end part of the virtual extension portion 26C on the fixed frame 27 side, which is fixed in a case where the first structural portion 80A resonates in the first resonance mode described above.

Figure 26:
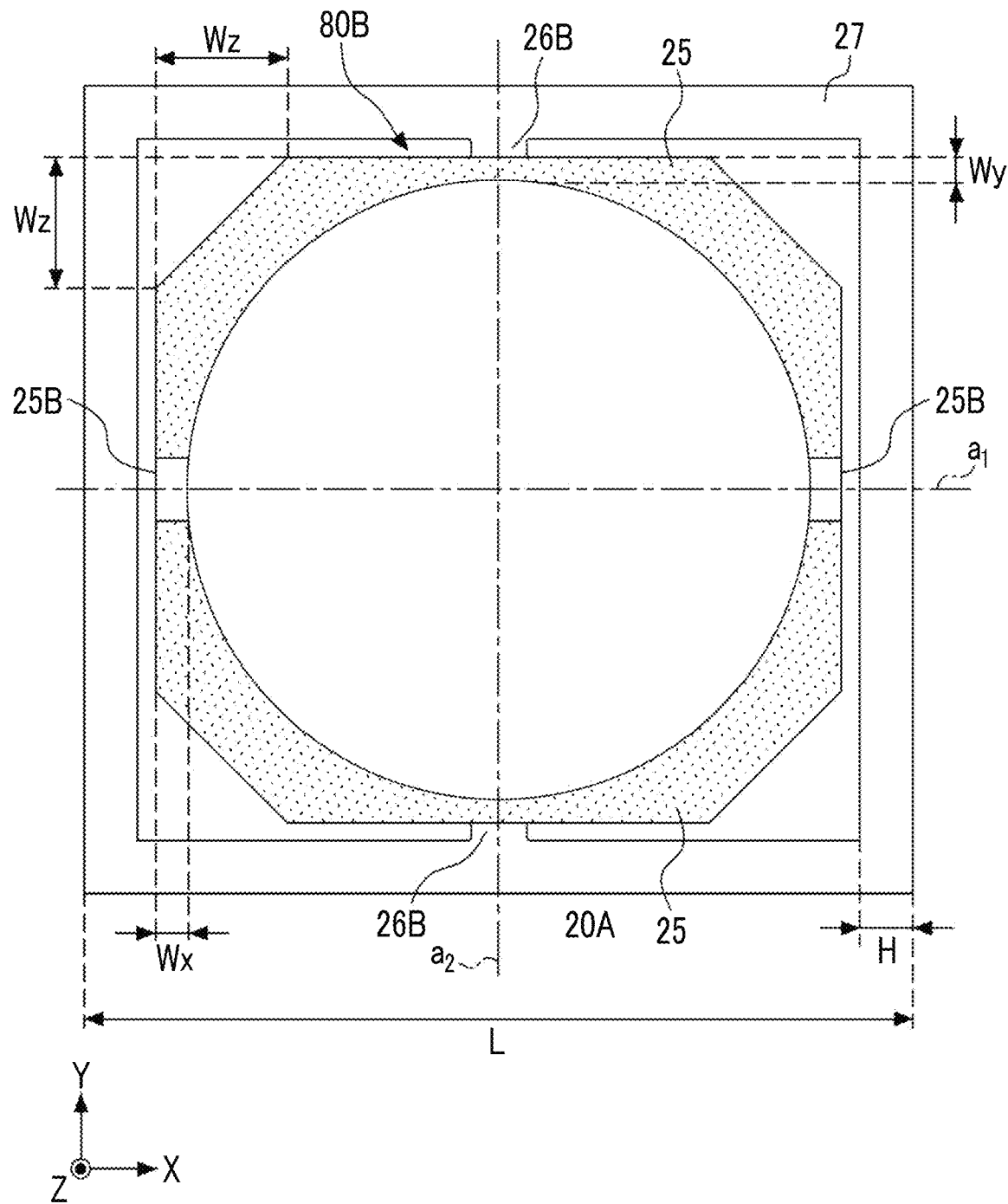
FIG. 26 is a plan view showing a second structural portion according to the second modification example.

FIG. 26 shows a second structural portion 80B according to the second modification example. The second structural portion 80B is different from the second structural portion 70B according to the first modification example in that the second connecting portion 26B is provided only in the vicinity of the second axis $a_2$. In addition, as described above, each corner portion of the second actuator 25 is notched. The second structural portion 80B is resonantly driven with the fixed frame 27 side of the second connecting portion 26B fixed.

Example 3

The present applicant performed the same vibration analysis simulation as in Example 1 for the MMD 2B according to the second modification example. Dimensions of the MMD 2B are the same as the dimensions of the MMD 2 according to the first embodiment. In the present modification example, a plurality of models 24 to 30 were created by changing a length Wz of the notched portion of the second actuator 25 in addition to the widths Wx and Wy.

FIG. 27 shows simulation results for each model. In FIG. 27, the models 24 to 30 are models created by setting T1>T2 and changing the length Wz (see FIG. 26) of the notched portion of the second actuator 25 in addition to the widths Wx and Wy. More specifically, the models 24 to 27 are models created by keeping the widths Wx and Wy constant and changing the length Wz. The models 28 to 30 are models created by setting Wz=0 and changing the widths Wx and Wy.

Figure 28:
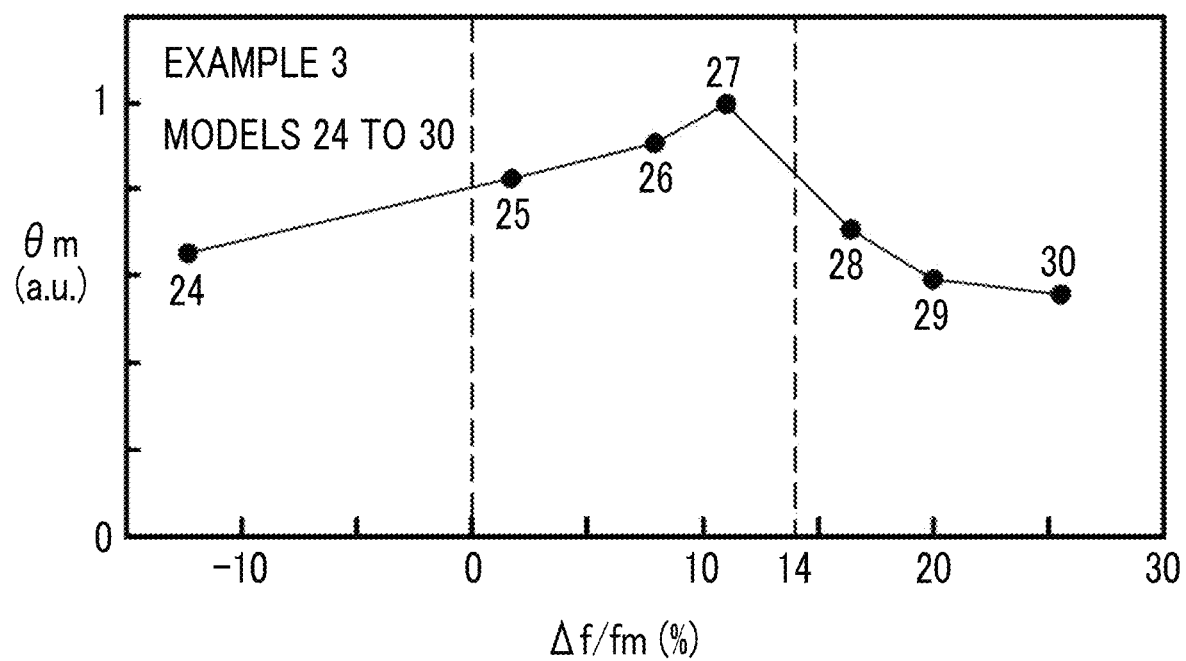
FIG. 28 is a graph showing simulation results for models 24 to 30.

FIG. 28 is a graph showing a relationship between the matching rate Δf/fm and the maximum deflection angle θm. From FIG. 28, it can be seen that the maximum deflection angle θm is maximized in a case where the matching rate Δf/fm satisfies Equation (4).

$$0 \leq \Delta f/fm \leq 0.14 \quad (4)$$

On the other hand, it can be seen that a rate of change of the maximum deflection angle θm with respect to a change of the matching rate Δf/fm is small and the manufacturing robustness is improved in a case where the matching rate Δf/fm satisfies Equation (5) or (6).

$$\Delta f/fm < 0 \quad (5)$$

$$\Delta f/fm > 0.14 \quad (6)$$

Other Modification Examples

In the first embodiment and each modification example, the first support portion 21 is provided with the coupling portion 21B having a folded structure, but the folded structure is not essential. Similarly, the second support portion 23 is provided with the coupling portion 23B having a folded structure, but the folded structure is not essential.

In addition, in the first embodiment and each modification example, a plurality of first connecting portions 26A and a plurality of second connecting portions 26B are provided, but the number of the first connecting portions 26A and the number of the second connecting portions 26B may be one (single), respectively.

Figure 29A:
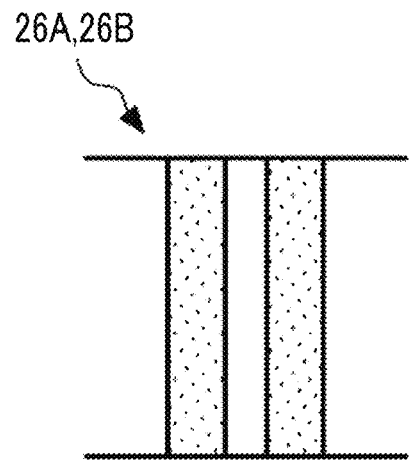
FIGS. 29A to 29C are diagrams showing modification examples of shapes of a first connecting portion and a second connecting portion, where
Figure 29B:
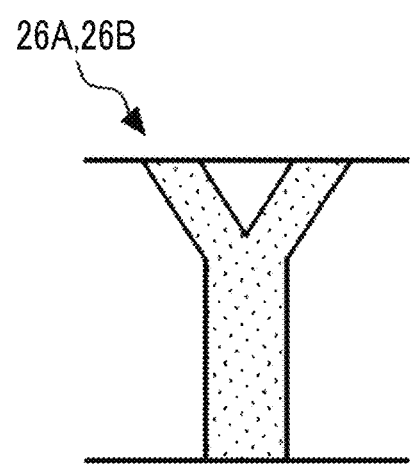
Figure 29C:
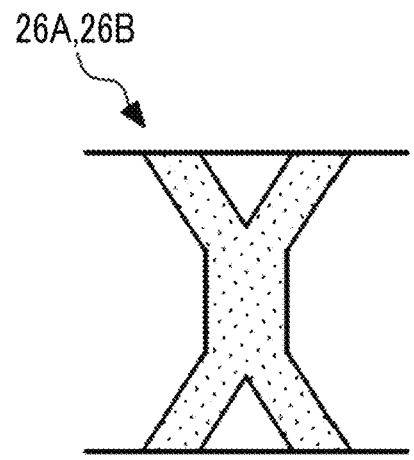

In addition, in the first embodiment and each modification example, the shapes of the first connecting portion 26A and the second connecting portion 26B are rectangular, but the shape is not limited to the rectangular shape. The first connecting portion 26A and the second connecting portion 26B need only be shaped along the first axis $a_1$ or the second axis $a_2$ and need only function as a spring element for rotational motion. For example, as the shapes of the first connecting portion 26A and the second connecting portion 26B, the shapes shown in FIGS. 29A to 29C can be applied. FIG. 29A shows a first shape composed of a plurality of bars arranged in parallel. FIG. 29B shows a second shape in which one end of a bar is branched. FIG. 29C shows a third shape in which both ends of a bar are branched.

The first connecting portion 26A need only connect the first actuator 24 and the second actuator 25 in the vicinity of either one or both of the first axis $a_1$ and the second axis $a_2$. Similarly, the second connecting portion 26B need only connect the fixed frame 27 and the second actuator 25 in the vicinity of either one or both of the first axis $a_1$ and the second axis $a_2$. The second connecting portion 26B includes at least one of the second A connecting portion or the second B connecting portion. The second A connecting portion connects the fixed frame 27 and the second actuator 25 on the same axis as the first connecting portion 26A. The second B connecting portion connects the fixed frame 27 and the second actuator 25 in the vicinity of an axis orthogonal to the axis on which the first connecting portion 26A is disposed.

The first embodiment is an example of a form in which the second connecting portion 26B includes only the second A connecting portion. The first modification example is an example of a form in which the second connecting portion 26B includes both the second A connecting portion and the second B connecting portion. The second modification example is an example of a form in which the second connecting portion 26B includes only the second B connecting portion. In the first embodiment and the first modification example, the first structural portion includes the second A connecting portion.

The hardware configuration of the driving controller 4 can be variously modified. A processing unit of the driving controller 4 may be composed of one processor or may be composed of a combination of two or more processors of the same type or different types. The processor includes, for example, a CPU, a programmable logic device (PLD), or a dedicated electric circuit. As is well known, the CPU is a general-purpose processor that executes software (program) to function as various processing units. The PLD is a processor such as a field programmable gate array (FPGA) whose circuit configuration can be changed after manufacture. The dedicated electric circuit is a processor that has a dedicated circuit configuration designed to perform a specific process, such as an application specific integrated circuit (ASIC).

All documents, patent applications, and technical standards mentioned in this specification are incorporated herein by reference to the same extent as in a case where each document, each patent application, and each technical standard are specifically and individually described by being incorporated by reference.

What is claimed is:

1. A micromirror device comprising:
a mirror portion having a reflecting surface for reflecting incident light;
a first support portion that is connected to the mirror portion on a first axis located in a plane including the reflecting surface of the mirror portion in a stationary state, and that swingably supports the mirror portion around the first axis;
a pair of movable frames that are connected to the first support portion and face each other across the first axis;
a second support portion that is connected to the movable frame on a second axis which is located in the plane including the reflecting surface of the mirror portion in the stationary state and is orthogonal to the first axis, and that swingably supports the mirror portion, the first support portion, and the movable frame around the second axis;
a pair of first actuators that are connected to the second support portion and face each other across the second axis, and that have a piezoelectric element;
a pair of second actuators that surround the first actuator and face each other across the first axis, and that have a piezoelectric element;
a first connecting portion that connects the first actuator and the second actuator;
a fixed frame that surrounds the second actuator; and
a second connecting portion that connects the second actuator and the fixed frame,
wherein the second actuator applies rotational torque around the first axis to the mirror portion and the first actuator applies rotational torque around the second axis to the movable frame, thereby allowing the mirror portion to swing around the first axis and the second axis, and
wherein the first connecting portion connects the first actuator and the second actuator in the vicinity of either one or both of the first axis and the second axis,
the second connecting portion connects the fixed frame and the second actuator in the vicinity of either one or both of the first axis and the second axis, and includes a second A connecting portion that connects the fixed frame and the second actuator on the same axis as the first connecting portion,
a virtual extension portion is configured in which the first connecting portion is virtually extended along the first axis to an end part of the second actuator on a side opposite to the mirror portion,
a first structural portion is formed of the mirror portion, the first support portion, the movable frame, the second support portion, the first actuator, the first connecting portion, the virtual extension portion, and the second A connecting portion, and a second structural portion is formed of the second actuator and the second connecting portion, and
in a case where a resonance frequency of a first resonance mode, in which the mirror portion swings around the first axis, among resonance modes of the first structural portion in a case where an end part of the second connecting portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of |fm−fa|/fm≤0.03 is satisfied.

2. A micromirror device comprising:
a mirror portion having a reflecting surface for reflecting incident light;
a first support portion that is connected to the mirror portion on a first axis located in a plane including the reflecting surface of the mirror portion in a stationary state, and that swingably supports the mirror portion around the first axis;
a pair of movable frames that are connected to the first support portion and face each other across the first axis;
a second support portion that is connected to the movable frame on a second axis which is located in the plane including the reflecting surface of the mirror portion in the stationary state and is orthogonal to the first axis, and that swingably supports the mirror portion, the first support portion, and the movable frame around the second axis;
a pair of first actuators that are connected to the second support portion and face each other across the second axis, and that have a piezoelectric element;
a pair of second actuators that surround the first actuator and face each other across the first axis, and that have a piezoelectric element;
a first connecting portion that connects the first actuator and the second actuator;
a fixed frame that surrounds the second actuator; and
a second connecting portion that connects the second actuator and the fixed frame,
wherein the second actuator applies rotational torque around the first axis to the mirror portion and the first actuator applies rotational torque around the second axis to the movable frame, thereby allowing the mirror portion to swing around the first axis and the second axis, and
wherein the first connecting portion connects the first actuator and the second actuator in the vicinity of either the first axis or the second axis,
the second connecting portion connects the fixed frame and the second actuator in the vicinity of one of the first axis and the second axis, the one axis being orthogonal to the other on which the first connecting portion is disposed,
a virtual extension portion is configured in which the first connecting portion is virtually extended along the first axis to an end part of the second actuator on a side opposite to the mirror portion,
a first structural portion is formed of the mirror portion, the first support portion, the movable frame, the second support portion, the first actuator, the first connecting portion, and the virtual extension portion, and a second structural portion is formed of the second actuator and the second connecting portion, and
in a case where a resonance frequency of a first resonance mode, in which the mirror portion swings around the first axis, among resonance modes of the first structural portion in a case where an end part of the virtual extension portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of 0≤(fm−fa)/fm≤0.14 is satisfied.

3. A micromirror device comprising:
a mirror portion having a reflecting surface for reflecting incident light;
a first support portion that is connected to the mirror portion on a first axis located in a plane including the reflecting surface of the mirror portion in a stationary state, and that swingably supports the mirror portion around the first axis;
a pair of movable frames that are connected to the first support portion and face each other across the first axis;
a second support portion that is connected to the movable frame on a second axis which is located in the plane including the reflecting surface of the mirror portion in the stationary state and is orthogonal to the first axis, and that swingably supports the mirror portion, the first support portion, and the movable frame around the second axis;
a pair of first actuators that are connected to the second support portion and face each other across the second axis, and that have a piezoelectric element;
a pair of second actuators that surround the first actuator and face each other across the first axis, and that have a piezoelectric element;
a first connecting portion that connects the first actuator and the second actuator;
a fixed frame that surrounds the second actuator; and
a second connecting portion that connects the second actuator and the fixed frame,
wherein the second actuator applies rotational torque around the first axis to the mirror portion and the first actuator applies rotational torque around the second axis to the movable frame, thereby allowing the mirror portion to swing around the first axis and the second axis, and
wherein the first connecting portion connects the first actuator and the second actuator in the vicinity of either one or both of the first axis and the second axis,
the second connecting portion connects the fixed frame and the second actuator in the vicinity of either one or both of the first axis and the second axis, and includes a second A connecting portion that connects the fixed frame and the second actuator on the same axis as the first connecting portion,
a virtual extension portion is configured in which the first connecting portion is virtually extended along the first axis to an end part of the second actuator on a side opposite to the mirror portion,
a first structural portion is formed of the mirror portion, the first support portion, the movable frame, the second support portion, the first actuator, the first connecting portion, the virtual extension portion, and the second A connecting portion, and a second structural portion is formed of the second actuator and the second connecting portion, and
in a case where a resonance frequency of a first resonance mode, in which the mirror portion swings around the first axis, among resonance modes of the first structural portion in a case where an end part of the second connecting portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of |fm−fa|/fm>0.03 is satisfied.

4. A micromirror device comprising:
a mirror portion having a reflecting surface for reflecting incident light;
a first support portion that is connected to the mirror portion on a first axis located in a plane including the reflecting surface of the mirror portion in a stationary state, and that swingably supports the mirror portion around the first axis;
a pair of movable frames that are connected to the first support portion and face each other across the first axis;
a second support portion that is connected to the movable frame on a second axis which is located in the plane including the reflecting surface of the mirror portion in the stationary state and is orthogonal to the first axis, and that swingably supports the mirror portion, the first support portion, and the movable frame around the second axis;
a pair of first actuators that are connected to the second support portion and face each other across the second axis, and that have a piezoelectric element;
a pair of second actuators that surround the first actuator and face each other across the first axis, and that have a piezoelectric element;
a first connecting portion that connects the first actuator and the second actuator;
a fixed frame that surrounds the second actuator; and
a second connecting portion that connects the second actuator and the fixed frame,
wherein the second actuator applies rotational torque around the first axis to the mirror portion and the first actuator applies rotational torque around the second axis to the movable frame, thereby allowing the mirror portion to swing around the first axis and the second axis, and
wherein the first connecting portion connects the first actuator and the second actuator in the vicinity of either the first axis or the second axis,
the second connecting portion connects the fixed frame and the second actuator in the vicinity of one of the first axis and the second axis, the one axis being orthogonal to the other on which the first connecting portion is disposed,
a virtual extension portion is configured in which the first connecting portion is virtually extended along the first axis to an end part of the second actuator on a side opposite to the mirror portion,
a first structural portion is formed of the mirror portion, the first support portion, the movable frame, the second support portion, the first actuator, the first connecting portion, and the virtual extension portion, and a second structural portion is formed of the second actuator and the second connecting portion, and
in a case where a resonance frequency of a first resonance mode, in which the mirror portion swings around the first axis, among resonance modes of the first structural portion in a case where an end part of the virtual extension portion on a fixed frame side is fixed is denoted by fm, and a resonance frequency of a second resonance mode, in which the first axis is located in a vibration node and displacement distribution in an out-of-plane direction of the second actuator with respect to the first axis is symmetrical, among resonance modes of the second structural portion in a case where the fixed frame side of the second connecting portion is fixed is denoted by fa, a relationship of (fm−fa)/fm<0 or (fm−fa)/fm>0.14 is satisfied.

5. The micromirror device according to claim 1,
wherein the first actuator has the same thickness as the mirror portion, and the second actuator has a thinner thickness than the first actuator.

6. The micromirror device according to claim 1,
wherein the first connecting portion is disposed along the first support portion.

7. The micromirror device according to claim 1,
wherein each of the pair of first actuators is semi-annular.

8. The micromirror device according to claim 1,
wherein each of the pair of second actuators is semi-annular.

9. An optical scanning device comprising:
the micromirror device according to claim 1; and
a processor that drives the first actuator and the second actuator,
wherein the processor allows the mirror portion to resonate around the first axis and the second axis by providing a driving signal to the first actuator and the second actuator.

* * * * *